US008774508B2

(12) United States Patent
Anbai et al.

(10) Patent No.: US 8,774,508 B2
(45) Date of Patent: Jul. 8, 2014

(54) LOCAL FEATURE AMOUNT CALCULATING DEVICE, METHOD OF CALCULATING LOCAL FEATURE AMOUNT, CORRESPONDING POINT SEARCHING APPARATUS, AND METHOD OF SEARCHING CORRESPONDING POINT

(75) Inventors: Mitsuru Anbai, Tokyo (JP); Yuichi Yoshida, Tokyo (JP)

(73) Assignee: Denso It Laboratory, Inc., Tokyo (JP)

( * ) Notice: Subject to any disclaimer, the term of this patent is extended or adjusted under 35 U.S.C. 154(b) by 92 days.

(21) Appl. No.: 13/405,723

(22) Filed: Feb. 27, 2012

(65) Prior Publication Data

US 2013/0223737 A1    Aug. 29, 2013

(51) Int. Cl.
*G06K 9/00*   (2006.01)

(52) U.S. Cl.
USPC .......................................... 382/170; 382/195

(58) Field of Classification Search
USPC ................................................. 382/170, 195
See application file for complete search history.

(56) References Cited

U.S. PATENT DOCUMENTS

| 6,711,293 | B1 | 3/2004 | Lowe | |
| 7,627,178 | B2* | 12/2009 | Suzuki et al. | 382/190 |
| 8,160,366 | B2* | 4/2012 | Nakamura et al. | 382/190 |
| 8,290,308 | B2* | 10/2012 | Nakagata et al. | 382/299 |
| 8,311,291 | B2* | 11/2012 | Yonezawa et al. | 382/118 |
| 2005/0213818 | A1 | 9/2005 | Suzuki et al. | |
| 2008/0247651 | A1 | 10/2008 | Takaki et al. | |
| 2011/0311133 | A1* | 12/2011 | Hirota et al. | 382/164 |
| 2013/0108153 | A1* | 5/2013 | Lee | 382/159 |
| 2013/0202213 | A1* | 8/2013 | Adamek et al. | 382/201 |
| 2013/0223737 | A1* | 8/2013 | Anbai et al. | 382/170 |

FOREIGN PATENT DOCUMENTS

| JP | 2004-326693 A | 11/2004 |
| JP | 2008-257649 A | 10/2008 |

OTHER PUBLICATIONS

Fujiyoshi, "SIFT and Recent Approaches in Image Local Features", Journal of the Japanese Society for Artificial Intelligence, vol. 25, No. 6, 2010, pp. 753-760 (with a partial of English translation of pp. 756-760).
Decision to Grant, issued May 21, 2013, for Japanese Patent Application No. 2010-249142.
European Search Report for corresponding application No. 12157182.2, dated Feb. 21, 2013.
Mitsuru Ambai, et al., "CARD: Compact And Real-time Descriptors", Nov. 6, 2011, pp. 97-104, IEEE International Conference on Computer Vision.

(Continued)

*Primary Examiner* — Gregory M Desire
(74) *Attorney, Agent, or Firm* — Birch, Stewart, Kolasch & Birch, LLP

(57) ABSTRACT

A local feature amount calculating device includes a local feature amount calculating unit that acquires a local feature amount of a feature point for each pixel by giving a vote of a strength of the direction of a pixel, which is calculated by a direction strength calculating unit, to a vote cell to which a pixel of interest belongs out of vote cells of a rotated vote cell pattern that is acquired by rotating a reference vote cell pattern by an angle corresponding to a main axis direction along a corrected edge gradient direction that is acquired by correcting an edge gradient direction of the pixel that is calculated by a direction strength calculating unit in accordance with the main axis direction.

20 Claims, 25 Drawing Sheets

(56) References Cited

OTHER PUBLICATIONS

David G. Lowe, "Distinctive Image Features from Scale-Invariant Keypoints," International Journal of Computer Vision, 60, 2 (Jan. 5, 2004).

H. Jegou et al., "Improving bag-of-features for large scale image search," International Journal of Computer Vision, 2010.

Herbert Bay, et al."SURF: Speeded Up Robust Features," Computer Vision and Image Understanding (CVIU), vol. 110, No. 3 pp. 346-359, 2008.

M. Brown, et al., "Unsupervised 3D Object Recognition and Reconstruction in Unordered Datasets," International Conference on 3-D Digital Imagining and Modeling (3DIM 2005).

* cited by examiner

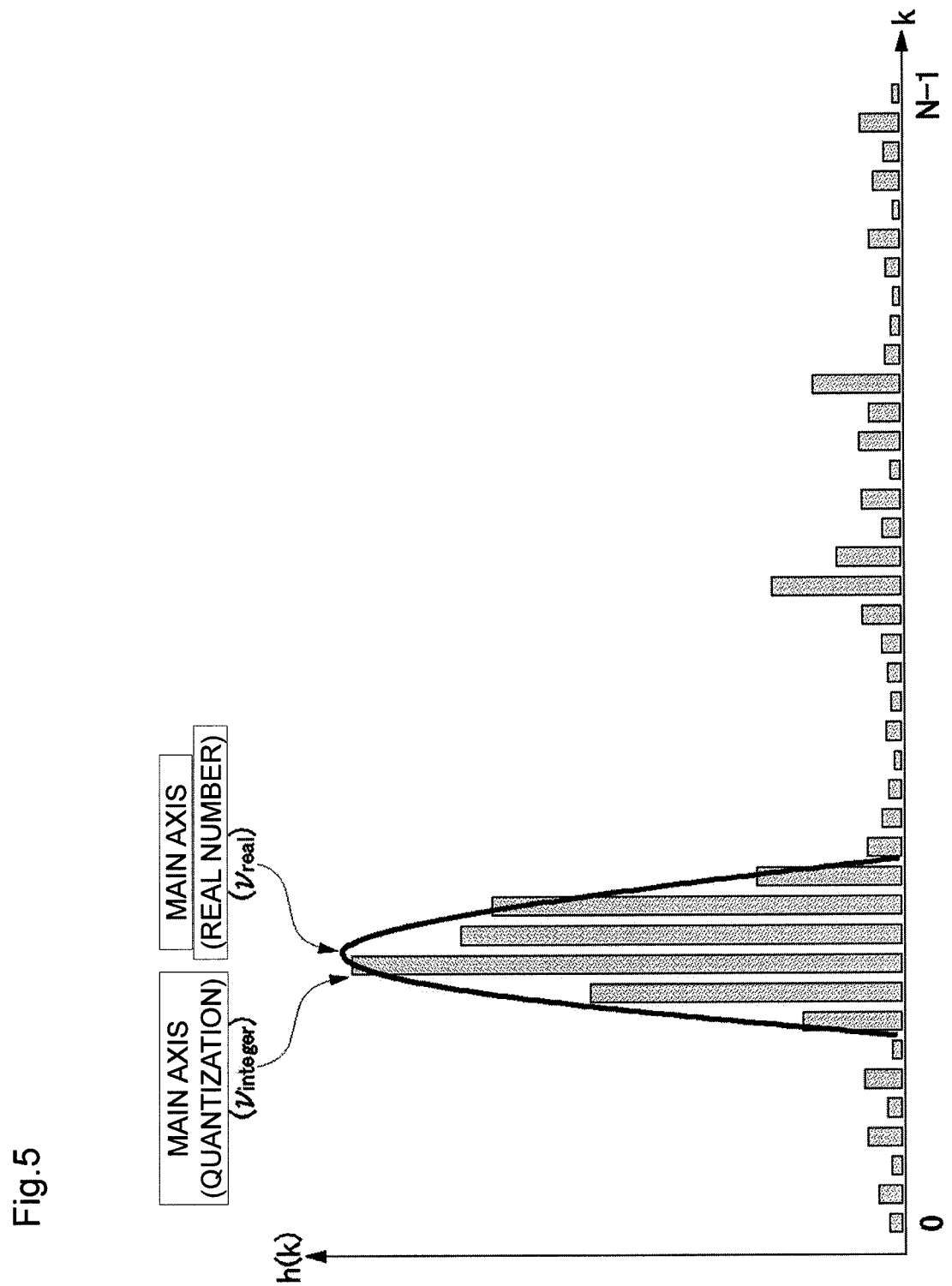

Fig.14

|  | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 0~4 | 0 | 1 | 2 | 3 | 4 | 5 | 6 | 7 | 8 | 9 | 10 | 11 | 12 | 13 | 14 | 15 | 16 |
| 5~9 | 0 | 8 | 1 | 2 | 3 | 4 | 5 | 6 | 7 | 16 | 9 | 10 | 11 | 12 | 13 | 14 | 15 |
| 10~14 | 0 | 7 | 8 | 1 | 2 | 3 | 4 | 5 | 6 | 15 | 16 | 9 | 10 | 11 | 12 | 13 | 14 |
| 15~19 | 0 | 6 | 7 | 8 | 1 | 2 | 3 | 4 | 5 | 14 | 15 | 16 | 9 | 10 | 11 | 12 | 13 |
| 20~24 | 0 | 5 | 6 | 7 | 8 | 1 | 2 | 3 | 4 | 13 | 14 | 15 | 16 | 9 | 10 | 11 | 12 |
| 25~29 | 0 | 4 | 5 | 6 | 7 | 8 | 1 | 2 | 3 | 12 | 13 | 14 | 15 | 16 | 9 | 10 | 11 |
| 30~34 | 0 | 3 | 4 | 5 | 6 | 7 | 8 | 1 | 2 | 11 | 12 | 13 | 14 | 15 | 16 | 9 | 10 |
| 35~39 | 0 | 2 | 3 | 4 | 5 | 6 | 7 | 8 | 1 | 10 | 11 | 12 | 13 | 14 | 15 | 16 | 9 |

$\nu_{integer}$

|  | 0 | 1 | 2 | 3 | 4 | 5 | 6 | 7 |
|---|---|---|---|---|---|---|---|---|
| $\nu_{integer}=0\sim4$ | 0 | 1 | 2 | 3 | 4 | 5 | 6 | 7 |
| $\nu_{integer}=5\sim9$ | 7 | 0 | 1 | 2 | 3 | 4 | 5 | 6 |
| $\nu_{integer}=10\sim14$ | 6 | 7 | 0 | 1 | 2 | 3 | 4 | 5 |
| $\nu_{integer}=15\sim19$ | 5 | 6 | 7 | 0 | 1 | 2 | 3 | 4 |
| $\nu_{integer}=20\sim24$ | 4 | 5 | 6 | 7 | 0 | 1 | 2 | 3 |
| $\nu_{integer}=25\sim29$ | 3 | 4 | 5 | 6 | 7 | 0 | 1 | 2 |
| $\nu_{integer}=30\sim34$ | 2 | 3 | 4 | 5 | 6 | 7 | 0 | 1 |
| $\nu_{integer}=35\sim39$ | 1 | 2 | 3 | 4 | 5 | 6 | 7 | 0 |

(a)　　　　　　　　　　(b)

LOCAL FEATURE AMOUNT CALCULATING DEVICE, METHOD OF CALCULATING LOCAL FEATURE AMOUNT, CORRESPONDING POINT SEARCHING APPARATUS, AND METHOD OF SEARCHING CORRESPONDING POINT

BACKGROUND OF THE INVENTION

1. Field of the Invention

The present invention relates to a local feature amount calculating device and a method of calculating a local feature amount, which are used for calculating a local feature amount of an image, and a corresponding point searching apparatus and a method of searching a corresponding point using a local feature amount calculating device.

2. Description of the Related Art

Conventionally, in the field of image processing, a corresponding point searching process for searching for corresponding points of two images is frequently used. FIG. 22 is a diagram illustrating corresponding points of two images. By searching for corresponding points of a plurality of images, it is possible to search an image database for an image corresponding to an input image or reconstruct the three-dimensional shape of a subject by associating a plurality of images of the subject photographed at different time points.

In order to search for corresponding points of two images, local feature amounts can be used. The local feature amount is an amount that features the texture pattern of the peripheral area of a pixel of interest and is represented in a D-dimensional vector. Thus, pixels that have peripheral texture patterns similar to each other have mutually similar local feature amounts. Accordingly, by acquiring the local feature amounts of the pixels of, for example, first and second images and comparing the local feature amounts with each other, it can be determined whether or not the pixels of the first image and the pixels of the second image are corresponding pixels (corresponding points).

FIG. 23 is a diagram illustrating an image search using local feature amounts. By performing a corresponding point search using local feature amounts, an image search can be performed as below (for example, see "Improving bag-of-features for large scale image search", International Journal of computer vision, 2010). The object of an image search here is to search an image database for an image corresponding to an input image. First, feature points are extracted from each one of a plurality of images registered in the image database, and the local feature amounts of the feature points are acquired. When an image (input image) as a search target is input, feature points are extracted from the input image, and the local feature amounts of the feature points are acquired. Then, one of the plurality of the feature points of the input image is set as a feature point of interest, and a local feature amount that is the closest to the local feature amount of the feature point of interest is searched from the image database. Then, one vote is given to an image to which the retrieved local feature amount belongs. This process is repeated for all the feature points included in the input image, and an image having the most votes is set as a search result.

In addition, by performing the corresponding point search using local feature amounts, as below, a three-dimensional shape can be reconstructed from a plurality of images photographed at different view points (for example, see "Unsupervised 3D object recognition and reconstruction in unordered datasets," International Conference on 3-D Digital Imaging and Modeling (3DIM 2005)). First, two images are selected from a plurality of images acquired by photographing a photographing subject at a plurality of photographing positions, and corresponding points of the two images are acquired. This corresponding point search is performed for all combinations of the plurality of images. Next, a photographing position parameter of each image and a shape parameter of the photographing subject are acquired through bundle adjustment by using the corresponding point information as a clue.

As representative techniques for acquiring the local characteristic amounts, a scale invariant feature transform (SIFT) (for example, see "Distinctive image features from scale-invariant keypoints," International Journal of Computer Vision, 60, 2 (2004) or U.S. Pat. No. 6,711,293) and speeded up robust features (SURF) (for example, see Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346-359, 2008) are known. According to the SIFT or the SURF, even in a case where an image is rotated, or there is a difference in the scales of images, local feature amounts can be calculated which are invariant regardless of (unaffected by) such a change. Accordingly, when corresponding points of two images are searched for, even in a case where an image is rotated, or there is a difference in the scales of the images, corresponding points of the images can be appropriately acquired.

Hereinafter, a technique for calculating local feature amounts will be described with reference to an example according to the SIFT. FIG. 24 is a flow diagram illustrating a process of calculating local feature amounts in accordance with the SIFT. In addition, FIGS. 25A to 27 are diagrams illustrating the process of calculating local feature amounts according to the SIFT. In the process of calculating local feature amounts, first, as illustrated in FIG. 25A, a feature point p and a near-field region NR set by using the feature point as its center are extracted from an image TP in Step S71. In a case where there is a plurality of feature points p, the near-field region NR is set for each feature point p. In the process of extracting the feature point p and the near-field region NR, the scale information of the image is output together with the position of the feature point p by a difference of Gaussians (DoG) filter. By cutting out the near-field region NR that has the feature point p as its center in accordance with the scale information, the scale invariance is realized.

Next, the direction of the main axis is acquired in Step S72. In the process of calculating the main axis, the following process is performed for each near-field region NR that is set for each feature point p. First, as illustrated in FIGS. 25C and 25D, for each pixel located inside the near-field region NR, differential values for x and y directions are calculated, and an edge strength $m(x, y)$ and an edge gradient direction $\theta(x, y)$ are acquired. Here, the edge strength $m(x, y)$ is weighted in accordance with a Gaussian window $G(x, y, \sigma)$ (see FIG. 25B) having the feature point p as its center so as to acquire a weighted edge strength $mhat(x, y)$. Accordingly, as a pixel is located closer to the center of the near-field region NR, the pixel is regarded to include more important information.

Next, a histogram of edge gradient directions is generated. Described in detail, the edge gradient direction of each pixel is quantized into 36 kinds, and a vote of the weighted edge strength $mhat(x, y)$ thereof is given to the corresponding direction. By quantizing the edge gradient directions and giving votes of the weighted edge strengths for all the pixels included in the near-field region NR as above, a histogram of the edge gradient directions as illustrated in FIG. 25E is acquired. Next, a maximum value is detected from the histogram of the gradient directions, a two-dimensional function is fitted by using values located on left and right sides in the direction having the maximum value, and the direction corresponding to a local maximum is set as the main axis direction v.

Next, rotation correction is made for the texture pattern located inside the near-field region in Step S73. In the rotation correction, the texture pattern located inside the near-field region NR is rotated such that the main axis direction v acquired in Step S72 coincides with a reference direction RD. FIG. 26 illustrates an example in which the reference direction is a horizontally rightward direction. The value of each pixel after rotating the near-field region NR is acquired through linear interpolation of the peripheral pixels. For the rotated texture pattern, a new near-field region NR' is set.

Next, a local feature amount is calculated in Step S74. In order to calculate the local feature amount, first, for each pixel located within the near-field region NR' that is newly set for the rotation-corrected texture pattern, differential values for the x and y directions are calculated again, and, as illustrated in FIG. 27A, the edge gradient directions and the edge gradient strengths are acquired. In FIGS. 27A and 27B, the direction of each arrow illustrates the edge gradient direction, and the length of the arrow illustrates the edge strength.

Next, the edge gradient directions of each pixel are quantized into eight kinds, and, as illustrated in FIG. 27B, the near-field region is divided into 4×4, thereby defining 16 vote cells VC are defined. In the example illustrated in FIG. 27B, one vote cell VC is formed by 2×2 pixels. Then, for each vote cell VC, a histogram of the gradient directions of eight kinds is acquired. Through the calculation described above, a feature vector of 16×8=128 dimensions is acquired. By normalizing the length of the feature vector as one, the local feature amount is acquired.

As described above, the local feature amount that has the rotation invariance and the scale invariance can be acquired. Although the description presented above is the process of calculating the local feature amount in accordance with the SIFT, the SURF is based on a concept similar thereto.

According to the SIFT, there is a problem in that the speed at which the local feature amount is calculated is slow. In addition, although the SURF is a technique for improving the calculation speed of the SIFT, sufficient performance is not acquired when it is operated by hardware of a low specification such as a mobile terminal. The reasons that cause the slow calculation speed are considered to be the following two factors.

The first reason is that, in the local feature amount calculating process according to the SIFT or the SURF, a differential value is calculated for each pixel included within the near-field region NR so as to acquire the main axis direction v, rotation correction is made for the texture pattern based on the acquired main axis direction v, and, for each pixel included within a new near-field region NR' after the rotation correction, a differential value is calculated again so as to calculate a local feature amount. In other words, although the differential value calculation performed for acquiring the main axis and the differential value calculation for acquiring the local feature amount are processes similar to each other, the processes are independently performed.

The second reason is that the amount of calculation required for performing the rotation correction of the texture pattern is enormous. In the calculation required for the rotation correction of the texture pattern, a linear interpolation process in units of sub pixels is necessary, and a large amount of floating-point calculation is accompanied, whereby the amount of calculation is large.

SUMMARY OF THE INVENTION

The object of the invention is to provide a local feature amount calculating device and a method of calculating a local feature amount, which are capable of calculating the local feature amount at high speed, and a corresponding point searching apparatus and a method of searching for a corresponding point that use them.

According to the invention, there is provided a local feature amount calculating device that calculates a local feature amount of an image and is configured to include: a feature point near-field region extracting unit that extracts a feature point and a near-field region that is set near the feature point from the image; a direction strength calculating unit that calculates a direction of each pixel located within the near-field region and a strength of the direction; a main axis direction detecting unit that detects a main axis direction of the near-field region; and a local feature amount calculating unit that acquires a local feature amount of the feature point for each pixel by giving a vote of the strength of the direction of a pixel, which is calculated by the direction strength calculating unit, to a vote cell to which the pixel belongs out of vote cells of a rotated vote cell pattern that is acquired by rotating a reference vote cell pattern by an angle corresponding to the main axis direction along a corrected direction that is acquired by correcting the direction of the pixel that is calculated by the direction strength calculating unit in accordance with the main axis direction.

According to this configuration, in order to realize rotation invariance, instead of rotating a texture pattern of a near-field region of a feature point and then giving votes to cells of vote cell patterns that have been newly set, vote cell patterns are rotated, and votes are given to vote cells of the rotated vote cell pattern (rotated vote cell pattern), and accordingly, no linear interpolating process in units of sub pixels accompanying a large amount of floating-point calculation performed for rotating the texture pattern is necessary, whereby the calculation of the local feature amount can be performed at high speed. In addition, the feature point near-field region extracting unit may extract feature points from pixels satisfying a predetermined condition out of pixels configuring an image or may extract feature points from all the pixels of the image. Furthermore, the main axis direction detecting unit may perform detection based on a detection value detected by a gyro sensor, a geomagnetic sensor, a gravity sensor, or the like that is included in an imaging device at the time of generating an image.

In addition, in the above-described local feature amount calculating device, the main axis direction detecting unit may detect the main axis direction of the near-field region based on directions of a plurality of the pixels located within the near-field region and the strengths of the directions that are calculated by the direction strength calculating unit.

As described above, in the local feature amount calculating device, in order to realize the rotation invariance, instead of rotating the texture pattern, the vote cell pattern is rotated, and, after the direction of each pixel is corrected, votes are given, and accordingly, it is not necessary to calculate the direction of each pixel and the strength of the direction again for the texture pattern after rotation, and accordingly, the direction of each pixel and the strength of the direction that are calculated by the direction strength calculating unit can be used also for detection of the main axis direction and for the calculation of the local feature amount. Accordingly, the differential value calculation performed for calculating the direction of each pixel and the strength of each pixel is completed once, and therefore the calculation of the local feature amount can be performed at high speed.

In addition, in the above-described local feature amount calculating device, it may be configured such that a direction quantizing unit that quantizes the direction of the pixel is further included, and the main axis direction detecting unit generates a direction histogram by giving a vote of the strength of the direction of the pixel along the direction of the pixel quantized by the direction quantizing unit and detects a direction corresponding to a local maximum of a curve as the main axis direction by approximating a portion near a peak of the direction histogram as a curve.

According to such a configuration, the strength is accumulated for each quantized direction, and the direction in which the accumulated value of the strength is the largest can be detected as a main axis. In addition, the peak of the histogram is approximated as a curve, and a direction in which the local maximum value of the histogram is included is set as the main axis direction, and accordingly, a main axis direction having a real number can be acquired. Furthermore, the main axis direction may be represented by a quantized number (integer) at the time of quantizing the direction of the pixel or may be represented in radians.

In addition, the above-described local feature amount calculating device may further include a vote cell pattern generating unit that generates the rotated vote cell pattern by rotating the reference vote cell pattern by an angle corresponding to the main axis direction.

In such a configuration, the rotated vote cell pattern that is rotated in correspondence with the main axis direction can be generated.

In addition, in the above-described local feature amount calculating device, it may be configured such that a direction correcting pattern generating unit that is used for correcting the direction of the pixel, which is calculated by the direction strength calculating unit, in accordance with the main axis direction is further included, and the local feature amount calculating unit acquires the corrected direction by correcting the direction of each pixel by using the direction correcting pattern.

According to such a configuration, since the direction of the pixel is corrected in correspondence with the main axis direction, an appropriate direction for giving a vote to the rotated vote cell pattern can be acquired.

In addition, in the above-described local feature amount calculating device, it may be configured such that a direction quantizing unit that quantizes the direction of the pixel is further included, and the main axis direction detecting unit generates a direction histogram by giving a vote of the strength of the direction of the pixel that is quantized by the direction quantizing unit along the direction of the pixel that is quantized by the direction quantizing unit and detects a direction in which a local maximum value is included in the direction histogram as the main axis direction.

According to such a configuration, the strength is accumulated for each quantized direction, and the direction in which the accumulated value of the strength is the largest can be detected as a main axis. In addition, a direction in which the local maximum value of the histogram is included is set as the main axis direction, and accordingly, discrete main axis directions can be acquired. Furthermore, the main axis direction may be represented by a quantized number (integer) at the time of quantizing the direction of the pixel or may be represented in radians.

In addition, in the above-described local feature amount calculating device, it may be configured such that a vote cell pattern table in which a plurality of vote cell patterns acquired by rotating the reference vote cell pattern by a plurality of angles corresponding to a plurality of the main axis directions detected by the main axis direction detecting unit is stored is further included, and the local feature amount calculating unit calculates the local feature amount by using a vote cell pattern corresponding to the main axis direction out of the vote cell patterns stored in the vote cell pattern table as the rotated vote cell pattern.

As described above, in a case where the main axis direction is acquired as a discrete value, the rotated vote cell pattern corresponding to each main axis direction can be prepared in advance so as to form a table. According to the above-described configuration, when the main axis direction is acquired by using such a table, by selecting a rotated vote cell pattern corresponding to the main axis direction from the table, it is not necessary to acquire a vote cell pattern through calculation each time, whereby the process can be performed at high speed. In addition, in a case where the rotated vote cell pattern that is stored in the vote cell pattern is configured to have the same size as that of the near-term region, the vote cell to which a vote is given by each pixel can be acquired by one memory access (table lookup).

In addition, in the above-described local feature amount calculating device, it may be configured such that a representative cell pattern table in which a plurality of representative vote cell patterns having unique shapes of the patterns out of a plurality of vote cell patterns acquired by rotating the reference vote cell pattern by a plurality of angles corresponding to a plurality of the main axis directions detected by the main axis detecting unit is stored is further included, a cell number converting table that is used for converting a cell number of the representative vote cell pattern along the main axis direction, the local feature amount calculating unit determines a vote cell to which a vote of the strength of the direction is given by converting the cell number of the representative cell pattern corresponding to the main axis direction out of the representative vote cell patterns stored in the representative cell pattern table in accordance with the main axis direction by referring to the cell number converting table.

In a case where the reference vote cell pattern has a point-symmetry shape, when it is rotated, the rotated vote cell pattern having the same pattern shape periodically appears. According to the above-described configuration, the vote cell pattern table is compressed by using the periodicity. In other words, for a plurality of rotated vote cell patterns having the same pattern shape, only one rotated vote cell pattern is stored in the vote cell pattern table as a representative vote cell pattern, and, for a main axis direction that has the same pattern shape as that of the representative vote cell pattern but has a different cell number, by converting the vote cell number of the representative vote cell pattern, a rotated cell pattern can be acquired in the main axis.

In addition, in the above-described local feature amount calculating device, it may be configured such that a direction correcting table in which the corrected direction for a direction quantized by the direction quantizing unit is defined for each of a plurality of the main axis directions detected by the main axis direction detecting unit is further included, and the local feature amount calculating unit acquires the corrected direction corresponding to the direction quantized by the direction quantizing unit along the main axis direction by referring to the direction correcting table.

In a case where the main axis direction can be acquired so as to be discrete also for the direction of the pixels, a table can be prepared. According to the above-described configuration, since the direction of each pixel is corrected by using the table, the corrected direction can be acquired through one memory access (table lookup), whereby the process can be performed at high speed.

In addition, in the above-described local feature amount calculating device, it may be configured such that a representative direction correcting table in which the main axis directions, in which the corrected directions for the directions quantized by the direction quantizing unit have a same period, are set as one group out of a plurality of the main axis directions detected by the main axis direction detecting unit, and the representative corrected directions for the directions quantized by the direction quantizing unit are defined for each group and a direction converting table that is used for converting the representative corrected direction of the representative direction correcting table along the main axis direction are further included, and the local feature amount calculating unit acquires the corrected direction by converting the representative corrected directions corresponding to the main axis direction and the directions quantized by the direction quantizing unit along the main axis direction by referring to the direction converting table out of the representative corrected directions defined in the representative direction correcting table.

In a case where the corrected direction has periodicity in the direction correcting table, the table can be compressed. According to the above-described configuration, the main axis direction in which the corrected direction has the same period is set as one group, and, only the representative corrected direction is stored for each group, and in a case where the direction is actually corrected, the representative correcting direction is acquired along the main axis direction by referring to the representative correction direction table, and, by converting the acquired representative correction direction, a corrected direction can be acquired.

In addition, in the above-described local feature amount calculating device, it may be configured such that the local feature amount calculating unit gives a vote of the strength of the direction of the pixel to a plurality of vote cells in accordance with a ratio of each vote cell occupying the pixel in a case where the pixel belongs to the plurality of vote cells for each pixel.

In addition, in the vote cell pattern, since the vote cells are set such that each pixel belongs to only one vote cell, an error occurs near the boundary of vote cells in accordance with a difference in the rotation angle of the rotated vote cell pattern. According to the above-described configuration, one pixel is configured to belong to a plurality of vote cells, and therefore an accurate vote value can be acquired not through the rotation angle of the rotated vote cell pattern.

In addition, in the above-described local feature amount calculating device, it may be configured such that the direction is an edge gradient direction of the pixel, and the strength of the direction is an edge strength of the pixel.

According to such a configuration, the direction and the strength thereof can be acquired by differentiating the pixel.

In addition, in the above-described local feature amount calculating device, it may be configured such that the local feature amount calculating unit gives a vote while weighting the strength of the direction in accordance with a size of the vote cell to which the vote of the strength of the direction is given.

As described above, in the vote cell pattern, although the vote cells can be set such that each pixel belongs to only one vote cell, in such a case, the area of the same vote cell differs in accordance with a difference in the rotation angle of the rotated vote cell pattern. According to the above-described configuration, the strength of a vote is weighted in accordance with the size of the vote cell, and accordingly, an error in the accumulated value of votes in the same vote cell due to a difference in the rotation angle of the rotated vote cell pattern can be relieved, as described above.

In addition, in the above-described local feature amount calculating device, it may be configured such that the direction strength calculating unit calculates the strength of the direction while more heavily weighting the strength as the pixel is closer to the feature point.

According to such a configuration, in the near-field region, as a pixel is located closer to the feature point, the pixel is regarded as a more important pixel.

According to another aspect of the invention, there is provided a corresponding point searching apparatus that searches for corresponding points of a plurality of images, and the corresponding point searching apparatus includes: one of the above-described local feature amount calculating devices; and a corresponding point searching unit that searches for the corresponding points of the plurality of images by comparing the local feature amounts of the plurality of images that are calculated by using the local feature amount calculating device with each other.

According to such a configuration, in order to search for corresponding points of a plurality of images, a local feature amount can be calculated at high speed.

According to yet another aspect of the invention, there is provided a method of calculating a local feature amount in which the local feature amount of an image is calculated, and the method includes: extracting a feature point from the image; setting a near-field region near the feature point; calculating a direction of each pixel located within the near-field region; calculating a strength of the direction of each pixel located within the near-field region; detecting a main axis direction of the near-field region based on the direction of the plurality of pixels located within the near-field region and the strength of the direction; acquiring a rotated vote cell pattern by rotating a reference vote cell pattern by an angle corresponding to the main axis direction; acquiring a corrected direction by correcting the direction of each pixel in accordance with the main axis direction; and acquiring a local feature amount of the feature point for each pixel located within the near-field region by giving a vote of the strength of the direction of a pixel to a vote cell to which the pixel belongs out of vote cells of a rotated vote cell pattern along the corrected direction.

According to this configuration, in order to realize rotation invariance, instead of rotating a texture pattern of a near-field region of a feature point and then giving votes to cells of vote cell patterns that have been newly set, vote cell patterns are rotated, and votes are given to vote cells of the rotated vote cell pattern (rotated vote cell pattern), and accordingly, no linear interpolating process in units of sub pixels accompanying a large amount of floating-point calculation performed for rotating the texture pattern is necessary, whereby the calculation of the local feature amount can be performed at high speed. Here, the above-described steps may not be necessarily performed in the described order. Furthermore, parts of the above-described steps may be performed in parallel with each other, or a part of the above-described steps may be performed in the order different from the described order.

According to further another aspect of the invention, there is provided a method of calculating a local feature amount in which the local feature amount of an image is calculated, and the method is configured to include: extracting a feature point from the image; setting a near-field region near the feature point; calculating a direction of each pixel located within the near-field region; quantizing the direction of each pixel located within the near-field region; calculating a strength of the direction of each pixel located within the near-field region; generating a direction histogram by giving a vote of the strength of the direction of the pixel along the direction of the pixel that is quantized in the quantizing of the direction and detecting a direction in which a local maximum value of the direction histogram is included as the main axis direction of the near-field region; determining a vote cell to which the pixel belongs in the vote cell pattern corresponding to the main axis direction for each pixel located within the near-field region by referring to a vote cell pattern table in which a plurality of vote cell patterns acquired by rotating a reference vote cell pattern by a plurality of angles corresponding to a plurality of main axis directions detected in the generating of a direction histogram is stored; acquiring corrected directions corresponding to the main axis direction and the directions quantized in the quantizing of the direction by referring to a direction correcting table in which the corrected directions for the directions quantized in the quantizing of the direction are defined for each one of the plurality of main axis directions detected in the generating of a direction histogram and detecting of a direction for each pixel located within the near-term area; and acquiring a local feature amount of the feature point for each pixel located within the near-field region by giving a vote of the strength of the direction of a pixel to a vote cell determined in the determining of a vote cell along the corrected direction.

According to this configuration, in order to realize rotation invariance, instead of rotating a texture pattern of a near-field region of a feature point and then giving votes to cells of vote cell patterns that have been newly set, vote cell patterns are rotated, and votes are given to vote cells of the rotated vote cell pattern (rotated vote cell pattern), and accordingly, no linear interpolating process in units of sub pixels accompanying a large amount of floating-point calculation performed for rotating the texture pattern is necessary, whereby the calculation of the local feature amount can be performed at high speed. In addition, since the main axis direction can be acquired as a discrete value, the rotated vote cell pattern can be acquired by using a table, and the direction of each pixel can be corrected by using a table, whereby the local feature amount can be calculated at higher speed. In addition, the vote cell pattern table and the direction correcting table may be a combination of a compressed table and a conversion table. Here, the above-described steps may not be necessarily performed in the described order. Furthermore, parts of the above-described steps may be performed in parallel with each other, or a part of the above-described steps may be performed in the order different from the described order.

According to further another aspect of the invention, there is provided a method of searching for corresponding points that is used for searching for corresponding points of a plurality of images, and the method includes: calculating local feature amounts of the plurality of images; and searching for the corresponding points of the plurality of images by comparing the local feature amounts of the plurality of images that are calculated in the calculating of local feature amounts with each other.

According to such a configuration, the local feature amount can be calculated at high speed so as to search for corresponding points of a plurality of images. Here, the above-described steps may not be necessarily performed in the described order. Furthermore, parts of the above-described steps may be performed in parallel with each other, or a part of the above-described steps may be performed in the order different from the described order.

According to further another aspect of the invention, there is provided a program that allows an operation processing device to perform one of the above-described methods.

According to the invention, in order to realize rotation invariance, instead of rotating a texture pattern of a near-field region of a feature point and then giving votes to cells of vote cell patterns that have been newly set, vote cell patterns are rotated, and votes are given to vote cells of the rotated vote cell patterns, and accordingly, no linear interpolating process in units of sub pixels accompanying a large amount of floating-point calculation performed for rotating the texture pattern is necessary, whereby the calculation of a local feature amount can be performed at high speed.

BRIEF DESCRIPTION OF THE DRAWINGS

FIG. 5 is a graph illustrating a histogram in the edge gradient direction, according to the first embodiment of the invention;

FIG. 14 is a diagram illustrating a compression converting table used for determining a vote cell pattern according to the second embodiment of the invention;

FIG. 15 is a diagram illustrating a direction correcting table according to the second embodiment of the invention;

FIG. 17 is a diagram illustrating a compression converting table used for direction correction according to the second embodiment of the invention;

Hereinafter, embodiments of the invention will be described with reference to the drawings. The embodiments described below are merely examples and are not for the purpose of limiting the scope of the invention.

DETAILED DESCRIPTION OF EMBODIMENTS

First Embodiment

Figure 1:
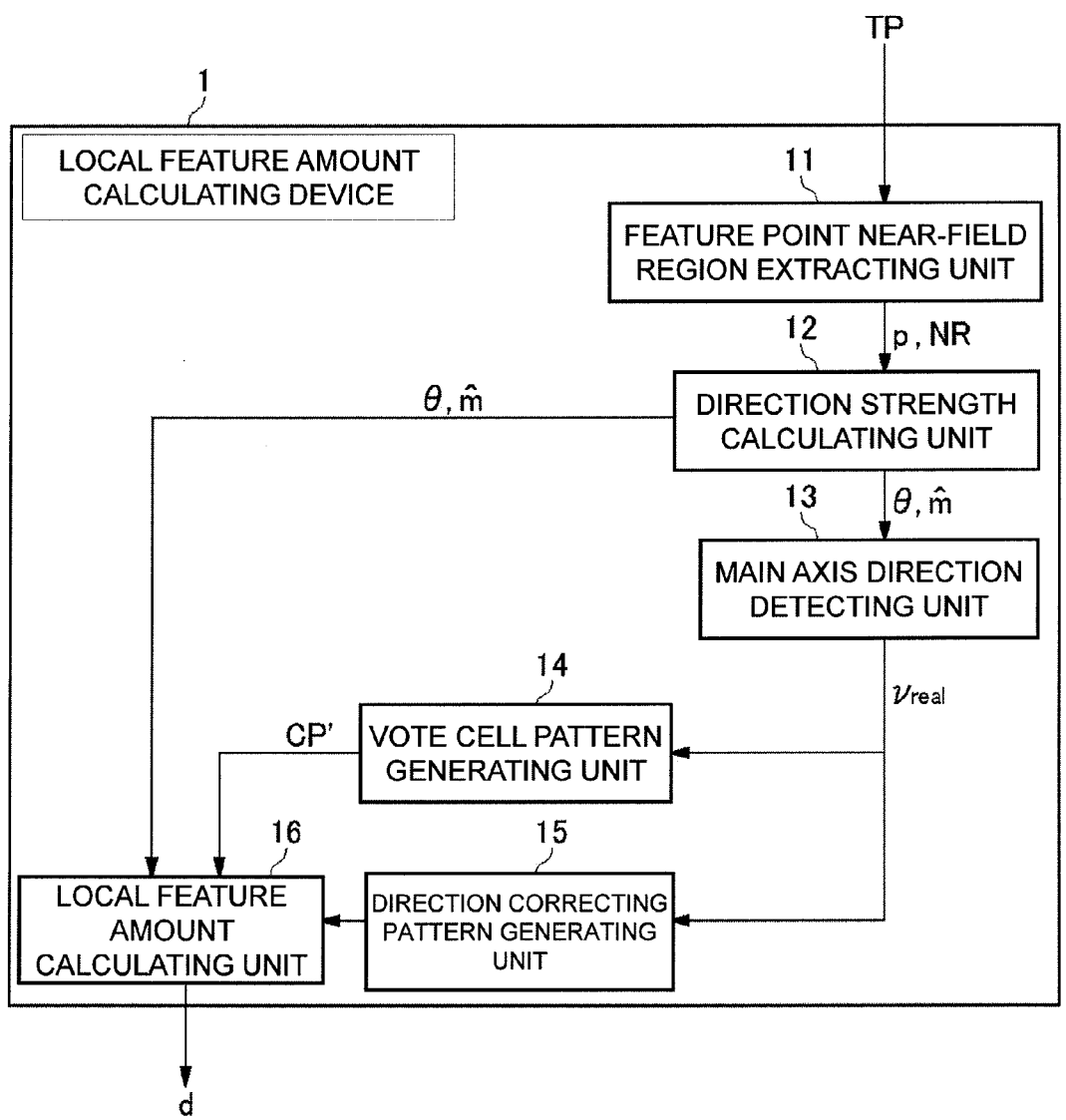
FIG. 1 is a block diagram illustrating the configuration of a local feature amount calculating device according to a first embodiment of the invention.

FIG. 1 is a block diagram illustrating the configuration of a local feature amount calculating device 1 according to a first embodiment of the invention. The local feature amount calculating device 1 includes: a feature point near-field region extracting unit 11; a direction strength calculating unit 12; a main axis direction detecting unit 13; a vote cell pattern generating unit 14; a direction correcting pattern generating unit 15; and a local feature amount calculating unit 16. In the local feature amount calculating device 1, the configuration illustrated in FIG. 1 may be realized by hardware, or the configuration illustrated in FIG. 1 may be realized by mounting software (computer program) in an operation processing device. The local feature amount calculating device 1 receives an image as an input and outputs a local feature amount included in the image.

An image TP is input to the feature point near-field region extracting unit 11. The feature point near-field region extracting unit 11 extracts pixels that satisfy a predetermined condition out of pixels configuring the target image as feature points p. The condition used for extracting the feature points is determined such that extraction can be performed with high reproducibility. For example, the feature points can be extracted by using an algorithm (corner detector) used for extracting corner points (corners).

As above, by extracting a part of pixels out of a plurality of pixels that configure the input image as feature points, a local feature amount is acquired only for the part of the pixels included in the input image, and accordingly, corresponding points can be searched for at high speed in a corresponding point search using the local feature amount. Alternatively, all the pixels included in the input image may be extracted as the feature points. In such a case, it can be expected to acquire a dense correspondence between images.

Figure 2:
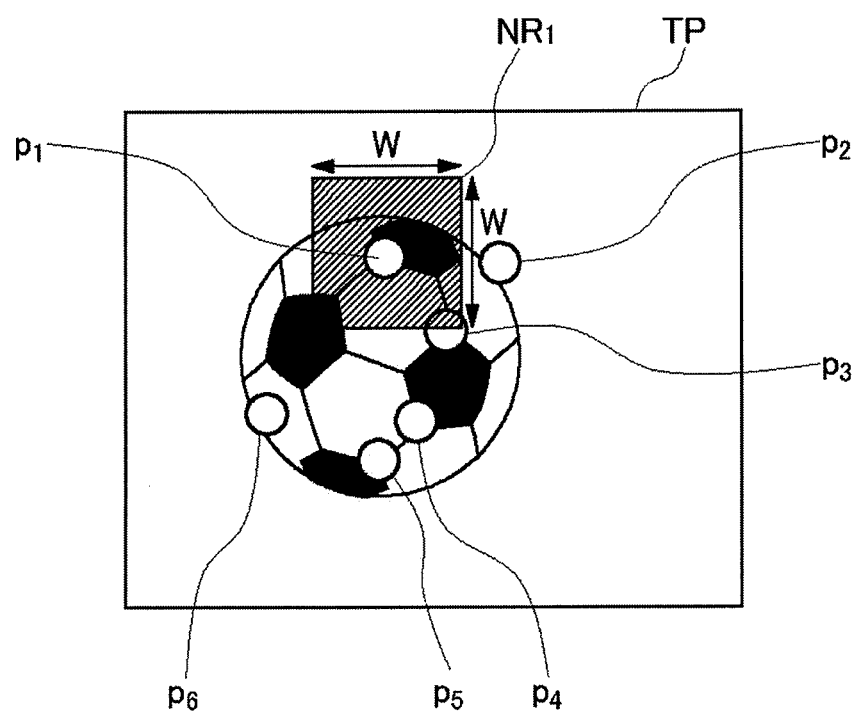
FIG. 2 is a diagram illustrating feature points and near-field regions thereof of an input image according to the first embodiment of the invention.

The feature point near-field region extracting unit 11 sets a predetermined area located near the extracted feature point p as a near-field region NR and extracts the set near-field region. In this embodiment, a square area of W×W pixels having the feature point as its center is set as the near-field region NR. FIG. 2 is a diagram illustrating feature points p1 to p6 extracted by the feature point near-field region extracting unit 11 and the near-field region NR1 of the feature point p1. Here, the shape of the near-field region is not limited to a square but may be any other shape such as a circle or a rectangle.

Figure 3:
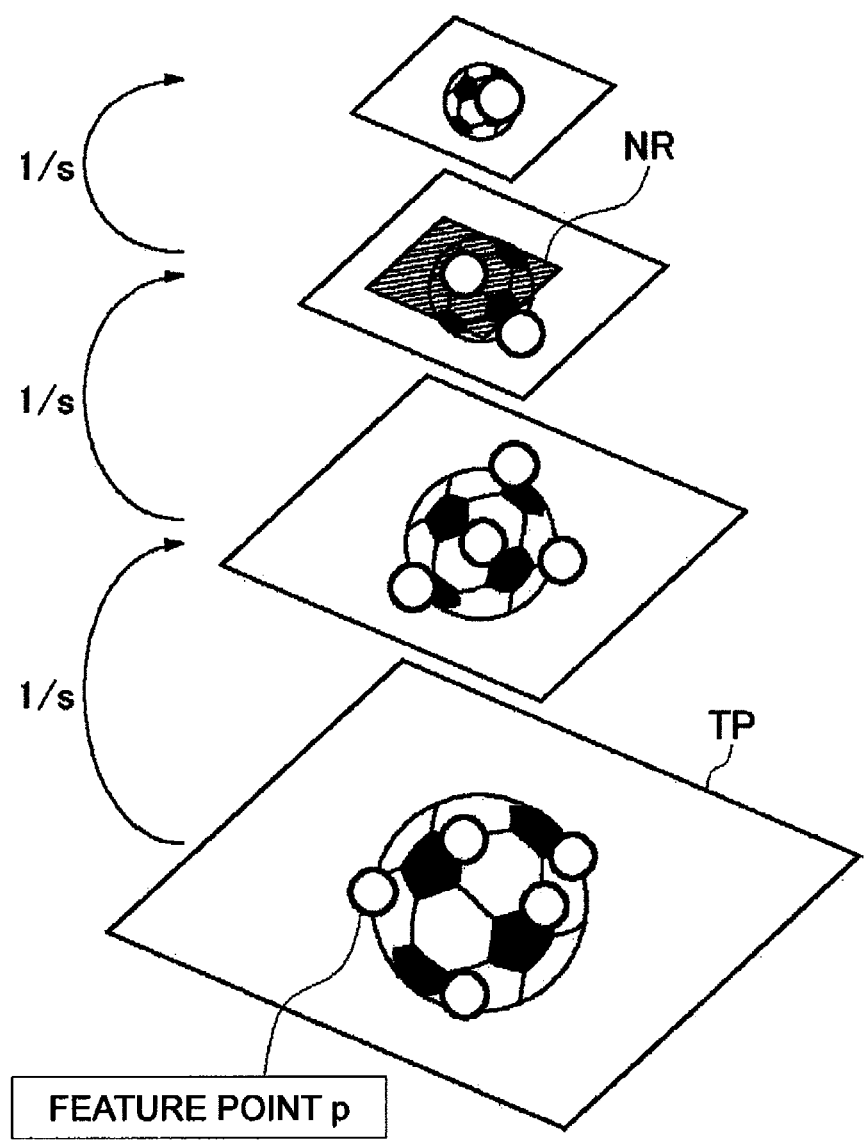
FIG. 3 is a diagram illustrating pyramid images acquired by reducing the input image according to the first embodiment of the invention in multiple steps.

The feature point near-field region extracting unit 11, as illustrated in FIG. 3, may be configured to acquire pyramid images that are acquired by reducing the size of the image TP in multiple steps, and independently extract feature points under the same condition and define the near-field regions thereof for the images of difference scales. FIG. 3 illustrates pyramid images that are reduced in size in multiple steps at the scale of 1/s. Accordingly, a local feature amount that has scale invariancescale invariance and is not affected by a difference in the scale can be acquired. In addition, the feature point near-field region extracting unit 11 may be configured to acquire scale information together with feature points by using a DoG filter and cut out a near-field region in accordance with the scale information. Even in such a case, a local feature amount that has scale invariancescale invariance can be acquired.

As above, the feature point near-field region extracting unit 11, generally, extracts a plurality of feature points p1 to pN from one input image and sets the near-field region NR for each feature point. Then, the local feature amount calculating device 1 calculates a local feature amount for each feature point. Here, although the direction strength calculating unit 12, the main axis direction detecting unit 13, the vote cell pattern generating unit 14, the direction correcting pattern generating unit 15, and the local feature amount calculating unit 16 will be described, in a case where a plurality of feature points p1 to pN are extracted by the feature point near-field region extracting unit 11, the above-described units 12 to 16 perform the process described as below for each one of the plurality of feature points p1 to pN. In the description presented below, a process of acquiring the local feature amount for one feature point will be described.

The direction strength calculating unit 12 calculates the direction of each pixel included in the near-field region NR and the strength in the direction. Here, according to the invention, the "direction" of a pixel represents the inclination of the distribution of pixel values in a small area including the periphery of the pixel. In addition, the "strength of the direction" represents the degree of the inclination, that is, the reliability of the "direction". Typically, the "direction" and the "strength of the direction" can be acquired based on edge information that is the edge information of a pixel acquired by differentiating the pixel value of the pixel. In other words, by differentiating a pixel in the x and y directions, an edge gradient direction and an edge strength can be acquired as the edge information, the edge gradient direction can be set as the "direction" of the pixel, and the edge strength can be set as the "strength of the direction". In this embodiment, as the "direction" and the "strength of the direction" of a pixel, the edge gradient direction and the edge strength are used. Described in detail, they are as follows. Hereinafter, $(x, y)^T$ represents coordinates on an image.

First, an x-direction differential value fx(x, y) and a y-direction differential value fy(x, y) of a pixel having coordinates (x, y) are acquired by using Equation (1) and Equation (2).

$$f_x(x,y)=f(x+1,y)-f(x-1,y) \quad (1)$$

$$f_y(x,y)=f(x,y+1)-f(x,y-1) \quad (2)$$

Then, an edge gradient direction θ(x, y) and an edge strength m(x, y) are acquired by using Equation (3) and Equation (4) using the x-direction differential value fx(x, y) and the y-direction fy(x, y).

$$\theta(x, y) = \tan^{-1}\left(\frac{f_y(x, y)}{f_x(x, y)}\right) \quad (3)$$

$$m(x, y) = \sqrt{f_x(x, y)^2 + f_y(x, y)^2} \quad (4)$$

However, according to Equation (3), the edge gradient direction cannot be distinguished between the first quadrant and the third quadrant and between the second quadrant and the fourth quadrant. Accordingly, by appropriately correcting the above-described edge gradient direction by referring to the signs of the x-direction differential value fx(x, y) and the y-direction differential value fy(x, y), a direction of 0 to 2π is acquired as the edge gradient direction. Hereinafter, for simplification of the description, it is assumed that the outputs of all the arctangents are values in the range of 0 to 2π.

The direction strength calculating unit 12 acquires a weighted edge strength mhat(x, y) by using Equation (5) using the edge strength acquired in Equation (4). Here, p=(px, py)T is the position of a feature point. In addition, "hat" represents "^" in the equation.

$$\hat{m}(x,y)=w(x-p_x,y-p_y)m(x,y) \quad (5)$$

Here, a function w(x, y) is a weight, and, for example, a two-dimensional Gaussian distribution having an average of (0, 0) T and a covariance matrix represented in following Equation can be used.

$$\begin{pmatrix} \sigma^2 & 0 \\ 0 & \sigma^2 \end{pmatrix}$$

Accordingly, as a pixel is located closer to the center, the pixel is regarded to be more important.

Although the weighted edge strength mhat(x, y) acquired by the direction strength calculating unit 12 is used by the main axis direction detecting unit 13 and the local feature amount calculating unit 16 that are positioned at later stages, it may be configured such that a weighted edge strength used for detecting the main axis direction and a weighted edge strength used for calculating the local feature amount are separately acquired by using mutually different weights w(x, y) as a weight used for detecting the main axis direction and a weight for calculating the local feature amount. Furthermore, it may be configured to detect the main axis direction by directly using the edge strength m(x, y) that has not been weighted and calculate a local feature amount.

The direction strength calculating unit 12 calculates the edge gradient direction θ(x, y) and the weighted edge strength mhat(x, y) as described above for each pixel included in the near-field region NR and outputs the calculated results to the main axis direction detecting unit 13 and the local feature amount calculating unit 16.

The main axis direction detecting unit 13 detect the main axis direction. Accordingly, first, the main axis direction detecting unit 13 quantizes the edge gradient direction θ(x, y) by using Equation (6).

$$\hat{\theta}(x,y)=\text{quantize}(\theta(x,y),N) \quad (6)$$

Here, the right side of Equation (6) is a function for quantizing the edge gradient direction θ(x, y) as a scalar from 0 to N−1, and, for example, Equation (6) can be used.

$$\text{quantize}(\theta, N) = \left\lfloor \frac{N\theta}{2\pi} + 0.5 \right\rfloor \text{mod} N \quad (7)$$

Figure 4:
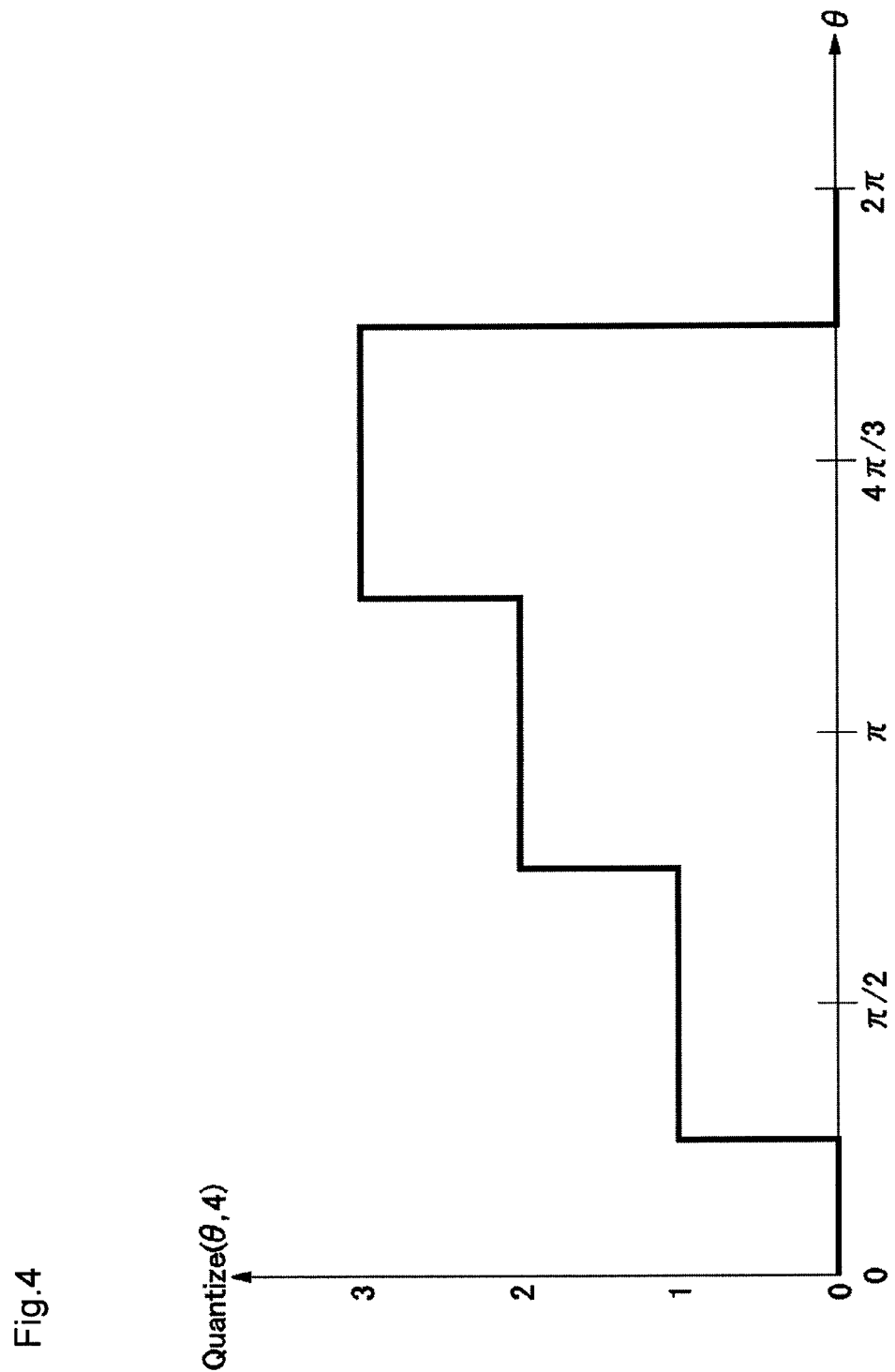
FIG. 4 is a graph illustrating quantization in an edge gradient direction, according to the first embodiment of the invention.

When Equation (7) is represented as a graph, for example, for the case of N=4, a graph as illustrated in FIG. 4 is acquired. In addition, as a result of experiments, it is understood that N=40 is appropriate.

When the edge gradient direction θ(x, y) of each pixel included in the near-field region NR is quantized, the main axis direction detecting unit 13 acquires a histogram h(k) of the edge gradient directions by using Equation (8) using the quantized edge gradient direction θhat(x, y) and the weighted edge strength mhat(x, y) acquired by the direction strength calculating unit 12.

$$h(k) = \sum_{(x,y)^T \in S_k} \hat{m}(x, y) \quad (8)$$

In Equation (8), Sk is given according to Equation (9).

$$S_k = \{(x,y)^T | (x,y)^T \text{ is located within the near-field region of a feature point } p \text{ and } \hat{\theta}(x,y)=k\} \quad (9)$$

As represented in Equation (8), as a vote value of the histogram of the edge gradient directions, the weighted edge strength hat(x, y) is used. FIG. 5 is a graph that represents an example of the histogram of the edge gradient directions that is acquired by using Equation (8).

The main axis direction detecting unit 13 acquires a main axis based on the histogram h(k) of the edge gradient directions. In this embodiment, the main axis direction detecting unit 13 performs a parabolic approximation of the vicinity of the peak of the histogram h(k) and sets the peak of the parabola represented in radians as a main axis v. The main axis v represents real numbers and is denoted by vreal. On the other hand, in another embodiment to be described later, the peak of the histogram is directly set as a main axis v. In such a case, the main axis v represents discrete values, that is, integer values in the range of 0 to N−1 or values acquired by converting the integer values into a value in radians, and thus, the main axis is denoted by vinteger so as to be differentiated from the main axis vreal.

In a case where there is a plurality of peaks in the histogram h(k) of the edge gradient directions, the main axis direction detecting unit 13 may be configured to detect a plurality of main axes. In such a case, local feature amounts corresponding to the number of the main axis directions are given, and accordingly, the search performance is improved in a corresponding point search using the local feature amounts. The main axis direction detecting unit 13 outputs the detected main axis direction vreal to the vote cell pattern generating unit 14 and the direction correcting pattern generating unit 15.

Figure 6A:
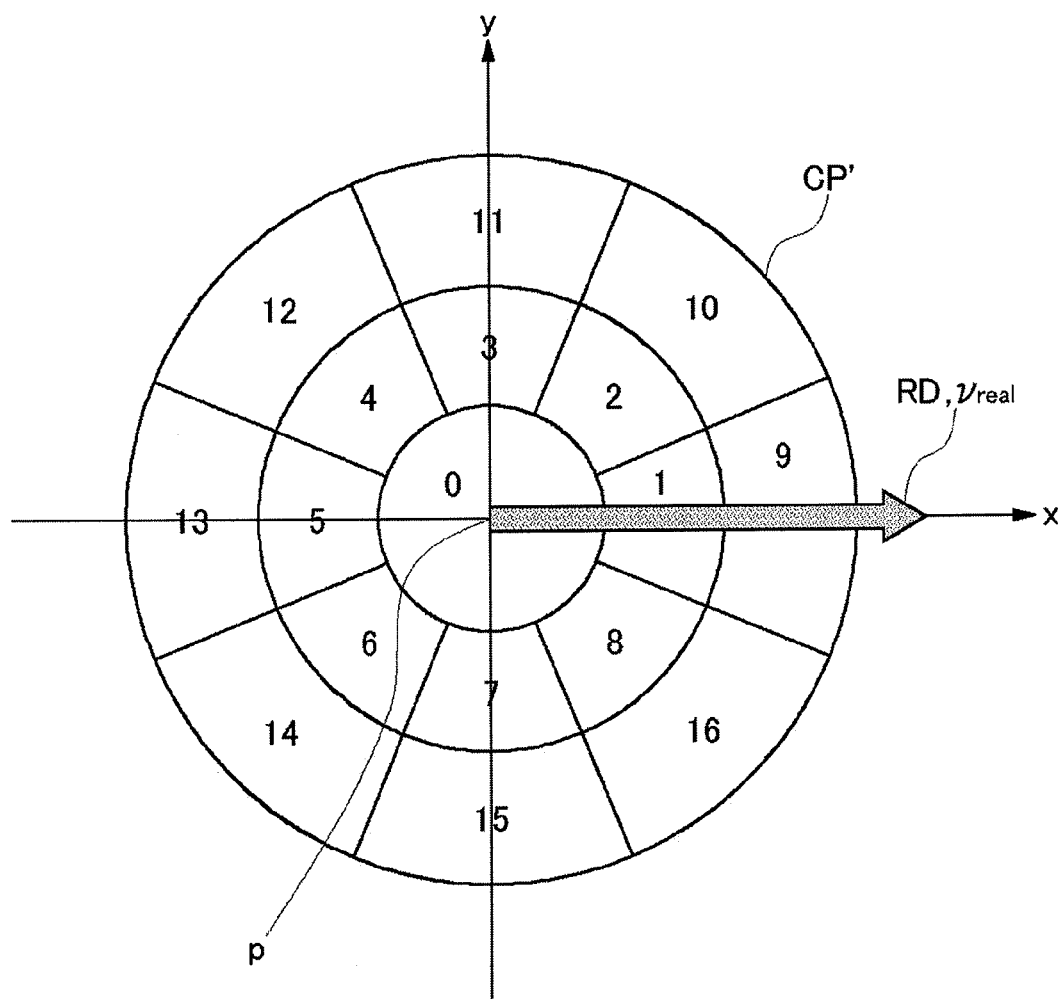
FIG. 6A is a diagram illustrating a vote cell pattern (zero degree in a main axis direction) according to the first embodiment of the invention.
Figure 6B:
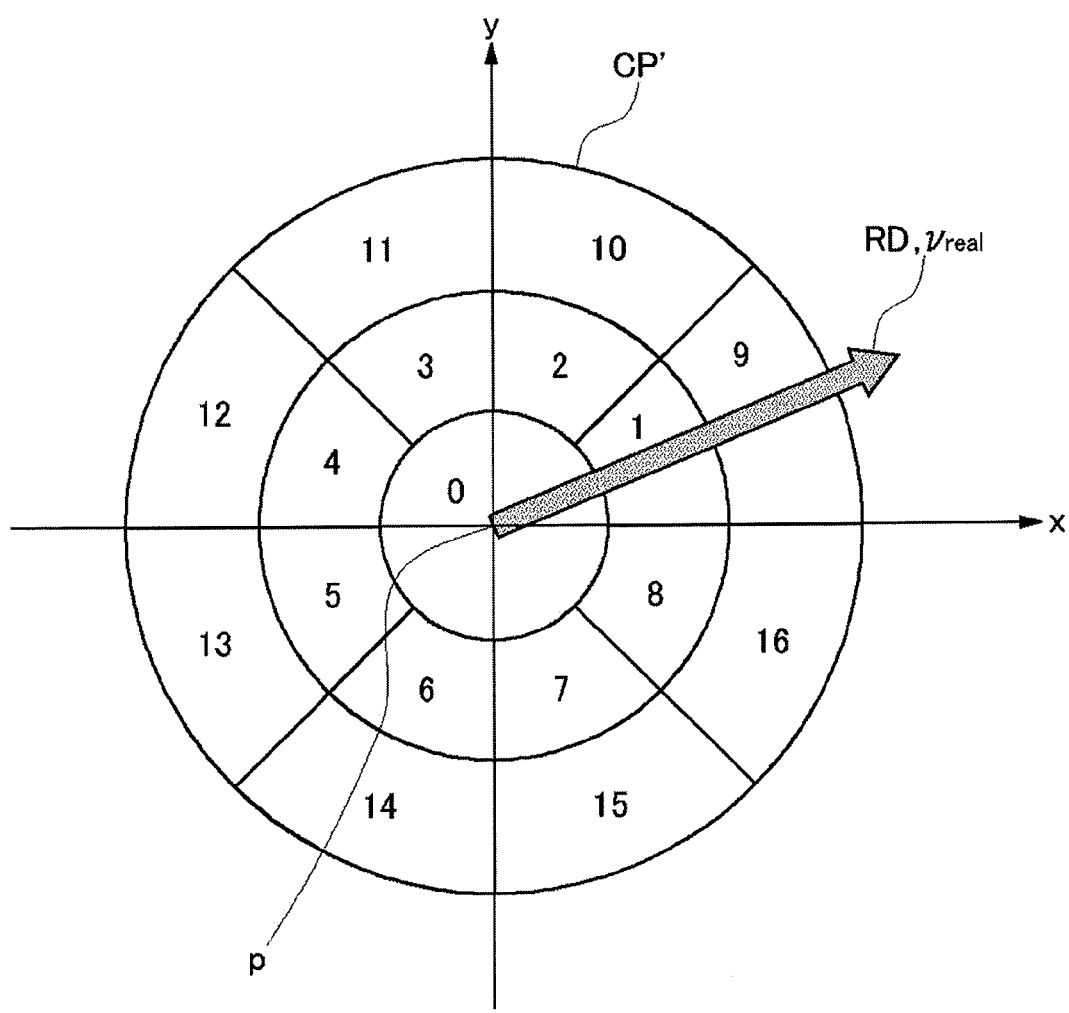
FIG. 6B is a diagram illustrating a vote cell pattern (22.5 degrees in the main axis direction) according to the first embodiment of the invention.

The vote cell pattern generating unit 14 rotates a reference cell pattern CP by an angle corresponding to the main axis direction vreal. In other words, the vote cell pattern generating unit 14 rotates the vote cell pattern CP such that the reference direction ED of the reference vote cell pattern CP coincides with the main axis direction vreal. Here, the vote ceiling pattern after rotation is referred to as a rotated vote cell pattern. Although the vote cell pattern, similarly to the SIFT described in the above-described related art, may be configured by vote cells partitioned on a grid of 4×4, in this embodiment, as illustrated in FIGS. 6A and 6B, a vote cell pattern is used in which vote cells are formed by dividing a circle into three areas along the circumference thereof and further dividing two donut-shaped areas that have been formed into 8 equal parts in the radial direction. Vote cell numbers are sequentially given to the vote cells VC of the vote cell pattern CP.

The reference vote cell pattern is set such that the center thereof is located at the position of the feature point, and the rotated vote cell pattern is acquired by rotating the reference vote cell pattern with the center thereof set as a point of view. A cell number "0" is given to a center cell, and, in the donut-shaped area located on the outer side thereof, vote cell numbers "1" to "8" are sequentially given from a vote cell located on the right side of the reference vote cell pattern in a counterclockwise direction, and, in the donut-shaped area located on the outermost side, vote cell numbers "9" to "16" are sequentially given from a vote cell located on the right side of the reference cell pattern in a counterclockwise direction. In other words, a vote cell pattern in which, in the donut-shaped area located on the outer side, vote cell numbers are sequentially set to "1" to "8" from the vote cell located on the right side in the counterclockwise direction, and, in the donut-shaped area located on the outermost side, vote cell numbers are sequentially set to "9" to "16" from the vote cell located on the right side of the reference vote cell pattern in the counterclockwise direction is the reference vote cell pattern according to this embodiment, and a rotated vote cell pattern is acquired by rotating the vote cell pattern. The reference direction RD of the reference vote cell pattern direction is formed in a direction passing through the centers of a vote cell 0, a vote cell 1, and a vote cell 9.

FIG. 6A illustrates a rotated vote cell pattern CP' (in other words, it is not rotated from the reference vote cell pattern) in which the reference direction RD overlaps the main axis vreal in a case where the main axis direction vreal is the horizontal rightward direction, and FIG. 6B is a rotated vote cell pattern CP' rotated such that the reference direction RD coincides with the main axis direction vreal when the main axis direction vreal is 22.5 degrees.

Figure 7:
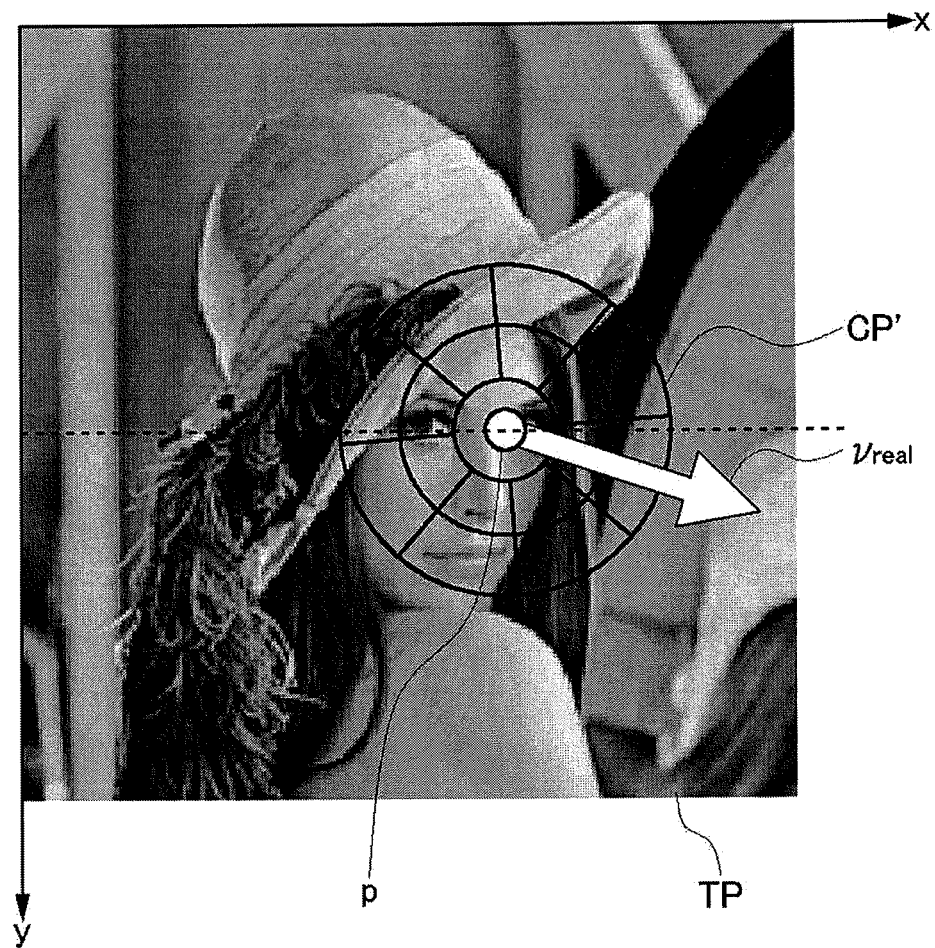
FIG. 7 is a diagram illustrating the appearance in which the vote cell pattern according to the first embodiment of the invention overlaps the input image.

FIG. 7 is a diagram illustrating the appearance in which the rotated vote cell pattern CP' overlaps the image TP. In the example illustrated in FIG. 7, the main axis direction vreal is 20 degrees, and the rotated vote cell pattern CP' is rotated such that the reference direction RD coincides with the direction of the main axis vreal. In a case where votes are given to each pixel, a vote is given to a vote cell to which the pixel belongs.

In a case where the main axis direction vreal is represented in radians, the rotated vote cell pattern CP' that has been rotated such that the reference direction RD of the reference vote cell pattern CP coincides with the main axis direction vreal is represented as Equation (10). In other words, the vote cell pattern generating unit 14 generates the vote cell pattern CP' rotated along the main axis vreal by substituting the main axis vreal in Equation (10). Here, (px, py)T is the position of the feature point p.

$$\text{voting\_cell\_pattern}_{v_{real}}(x, y) = \begin{cases} 0 & \text{if } \sqrt{(x-p_x)^2+(y-p_y)^2} < r_1 \\ 1 + \text{quantize}\left(v_{real} + \tan^{-1}\left(\frac{y-p_y}{x-p_x}\right), 8\right) & \text{if } r_1 \leq \sqrt{(x-p_x)^2+(y-p_y)^2} < r_2 \\ 9 + \text{quantize}\left(v_{real} + \tan^{-1}\left(\frac{y-p_y}{x-p_x}\right), 8\right) & \text{if } r_2 \leq \sqrt{(x-p_x)^2+(y-p_y)^2} < r_3 \end{cases} \quad (10)$$

By substituting the coordinates (x, y) of the pixel in Equation (10), a vote cell to be voted for by the pixel is determined. In Equation (10), r1, r2, and r3 denote the radius of the vote cell 0 of the vote cell pattern, the radius of the outer circumferences of the vote cells 1 to 8 (the radius of the inner circumference of the vote cells 9 to 16), and the radius of the outer circumference of the vote cells 9 to 16 of the cell pattern illustrated in FIGS. 6A and 6B. For example, when the size of the near-field region NR is a size of 25×25, it may be configured to be selected such that r1=3, r2=8, r3=12, and the like. The vote cell pattern generating unit 14 outputs the generated rotated vote cell pattern CP' to the local feature amount calculating unit 16.

The direction correcting pattern generating unit 15 generates a direction correcting pattern used for correcting the edge gradient direction θ(x, y) in accordance with the main axis direction vreal. The direction correcting pattern is represented as Equation (11).

$$\text{direction\_offset}_{v_{real}}(\theta) = \begin{cases} \theta - v_{real} & \theta > v_{real} \\ \theta - v_{real} + 2\pi & \theta \leq v_{real} \end{cases} \quad (11)$$

As is apparent from Equation (11), the direction correcting pattern is a correction pattern used for correcting the edge gradient direction θ(x, y) so as to negate an inclination of the main axis direction vreal from the reference direction RD. The direction correcting pattern generating unit 15 outputs the generated direction correcting pattern to the local feature amount calculating unit 16.

The local feature amount calculating unit 16 receives the edge gradient direction θ(x, y) and the weighted edge strength mhat(x, y) of each pixel included in the near-field region that are calculated by the direction strength calculating unit 12, the rotated vote cell pattern CP' generated by the vote cell pattern generating unit 14, and the direction correcting pattern generated by the direction correcting pattern generating unit 15 as inputs and acquires a local feature amount d by using the inputs. Described in detail, the local feature amount calculating unit 16 corrects the edge gradient direction θ(x, y) of each pixel located within the near-field region NR by using the direction correcting pattern so as to acquire a corrected edge gradient direction. Then, by giving votes to the weighted edge strength mhat(x, y) for the rotated vote cell pattern CP' in accordance with the corrected edge gradient direction, the local feature amount d is acquired.

When the vote is taken, the local feature amount calculating unit 16, first, corrects the edge gradient direction θ(x, y) of each pixel by using the direction correcting pattern so as to acquire a corrected edge gradient direction and quantizes the corrected edge gradient directions into 8 kinds. As illustrated in FIGS. 6A and 6B, the rotated vote cell pattern CP' according to this embodiment includes a total of 17 vote cells. Accordingly, when a histogram of eight directions is generated for each vote cell, and the histograms are connected to each other so as to be a local feature amount d, the local feature amount has 17×8=136 dimensions. In addition, in the generation of the histograms, votes are given to the weighted edge strengths mhat(x, y) of each pixel.

When the local feature amount is represented in a vector notation of d=(d0, d1, . . . , d135)T, di is acquired by using Equation (12).

$$d_i = \sum_{(x,y)^T \in S_i} \hat{m}(x, y) \quad (12)$$

Here, Si is given by Equation (13).

$$S_i = \{(x,y)^T | index(x,y)^T = i \text{ and } \sqrt{(x-p_x)^2 + (y-p_y)^2} < r_3\} \quad (13)$$

Here, index (x, y) represented in Equation (13) is given by Equation (14).

$$index(x,y) = 8 \times votiong\_cell\_pattern_{v_{real}}(x,y) + quantize(direction\_offset_{v_{real}}(\theta(x,y)), 8) \quad (14)$$

Here, votiong_cell_pattern$_{v_{real}}$(x, y) represented in Equation (14) is represented by Equation (10). In addition, direction_offset$_{v_{real}}$ (θ(x, y)) represented in Equation (14) is represented by Equation (11), and Equation (7) is used for the function "quantize(θ, 8)".

Figure 8:
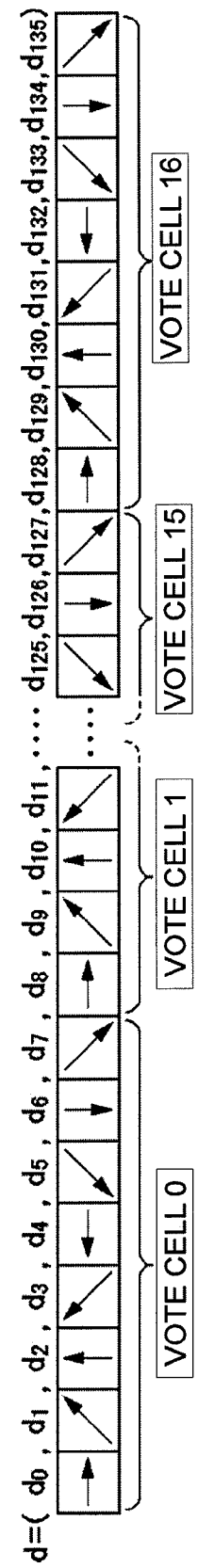
FIG. 8 is a diagram illustrating vectors that represent local feature amounts according to the first embodiment of the invention.

According to Equation (14), in the local feature amount d=(d0, d1, . . . , d135), d0, d1, d7 are the accumulated numbers of votes for eight directions that are given to the vote cell 0, d8, d9, . . . , d15 are the accumulated number of votes for eight directions that are given to the volte cell 1, and d16, d17, . . . , d23 are the accumulated number of votes for eight directions that are given to the vote cell 2, and the same is applied to the others after them. When this is represented in a drawing for the description, it is as illustrated in FIG. 8.

Figure 9:
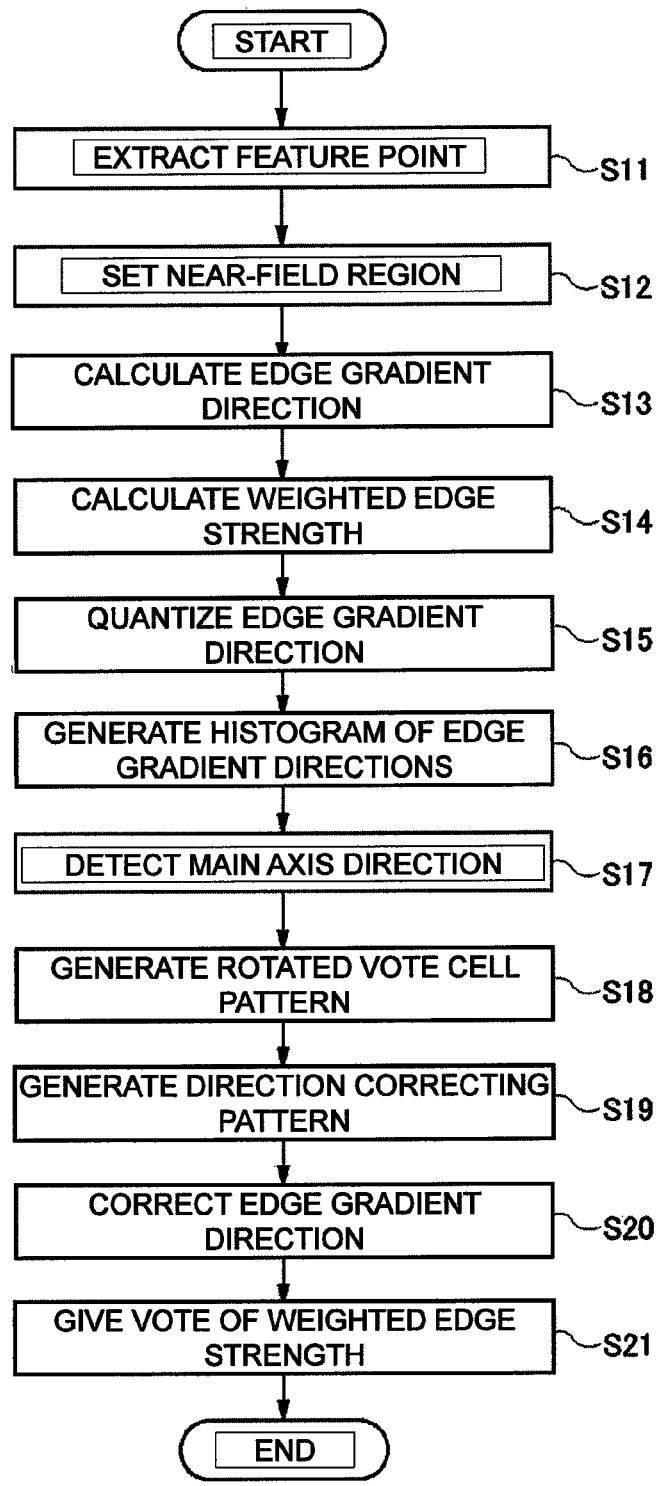
FIG. 9 is a flow diagram illustrating a method of calculating the local feature amount according to the first embodiment of the invention.

Next, a method of calculating a local feature amount will be described which is used in the local feature amount calculating device 1. The method of calculating a local feature amount may be performed by the local feature amount calculating device 1 configured by hardware or may be used by software (computer program) that configures the local feature amount calculating device 1 by being mounted in an operation processing device. FIG. 9 is a flow diagram illustrating a method of calculating a local feature amount according to this embodiment. According to the method of calculating a local feature amount of this embodiment, a local feature amount is calculated based on an input image.

First, the feature point near-field region extracting unit 11 extracts a feature point p from the image TP in Step S11. Next, the feature point near-field region extracting unit 11 sets a near-field region NR near the feature point p in Step S12. Then, the feature point near-field region extracting unit 11 outputs the feature point p and the near-field region NR to the direction strength calculating unit 12. The direction strength calculating unit 12 calculates an edge gradient direction (x, y) for each pixel located within the near-field region NR by differentiating each pixel located within the near-field region NR in the x and y directions in Step S13 and calculates a weighted edge strength mhat(x, y) in Step S14. One of the process of Step S13 and the process of Step S14 may be performed first, or both processes may be performed in parallel with each other.

Next, the main axis direction detecting unit 13 quantizes the edge gradient directions θ(x, y) in Step S15. Then, the main axis direction detecting unit 13 generates a histogram of edge gradient directions by giving votes of the weighted edge strength mhat(x, y) to the quantized edge gradient directions θhat(x, y) of the pixels located within the near-field region NR in Step S16. The main axis direction detecting unit 13 performs curve fitting near the peak of the histogram of the gradient directions and detects a direction (real number) corresponding to the local maximum of the curve as the main axis direction vreal of the near-field region NR in Step S17.

The vote cell pattern generating unit 14 generates a rotated vote cell pattern PC by acquiring the main axis direction vreal from the main axis direction detecting unit 13 and rotating a reference vote cell pattern PC in accordance with the main axis direction vreal in Step S18. In addition, the direction correcting pattern generating unit 15 generates a direction correcting pattern according to the main axis direction vreal in Step S19. Here, one of the process of Step S18 and the process of Step S19 may be performed first, or both processes may be performed in parallel with each other.

To the local feature amount calculating unit 16, the edge gradient direction θhat(x, y) and the weighted edge strength mhat(x, y) are input from the direction strength calculating unit 12, the rotated vote cell pattern PC' is input from the vote cell pattern generating unit 14, and the direction correcting pattern is input from the direction correcting pattern generating unit 15. The local feature amount calculating unit 16 corrects the edge gradient direction θhat(x, y) in accordance with the edge correcting pattern so as to acquire a corrected edge gradient direction for each pixel located within the near-field region NR in Step S20. The local feature amount calculating unit 16 gives a vote of the weighted edge strength mhat(x, y) of each pixel to the vote cell to which the pixel belongs out of the vote cells of the rotated vote cell pattern PC' in accordance with the corrected edge gradient direction in Step S21 for each pixel located within the near-field region NR. Accordingly, the local feature amount d of the feature point p is acquired.

As described above, according to this embodiment, in order to realize rotation invariance, instead of rotating a texture pattern of a near-field region NR of a feature point p and then giving votes to cells of the vote cell patterns that have been newly set, unlike a conventional technique, the reference vote cell pattern CP is rotated, and votes are given to vote cells of the rotated vote cell pattern (the rotated vote cell pattern CP'), and accordingly, no linear interpolating process in units of sub pixels accompanying a large amount of floating-point calculation performed for rotating the texture pattern is necessary, whereby the calculation of a local feature amount can be performed at high speed.

In addition, as described above, in order to realize the rotation invariance, instead of rotating the texture pattern, the reference vote cell pattern is rotated, and, after the direction of each pixel is corrected, votes are given, and accordingly, it is not necessary to calculate the direction of each pixel and the strength of the direction again for the texture pattern after rotation, unlike the conventional technique, and accordingly, the edge gradient direction and the edge strength of each pixel that are calculated by the direction strength calculating unit 12 can be used also for detection of the main axis direction vreal and for the calculation of the local feature amount. Accordingly, the differential value calculation performed for calculating the edge gradient direction and the edge strength of each pixel is completed once, and therefore the calculation of the local feature amount can be performed at high speed.

Second Embodiment

Figure 10:
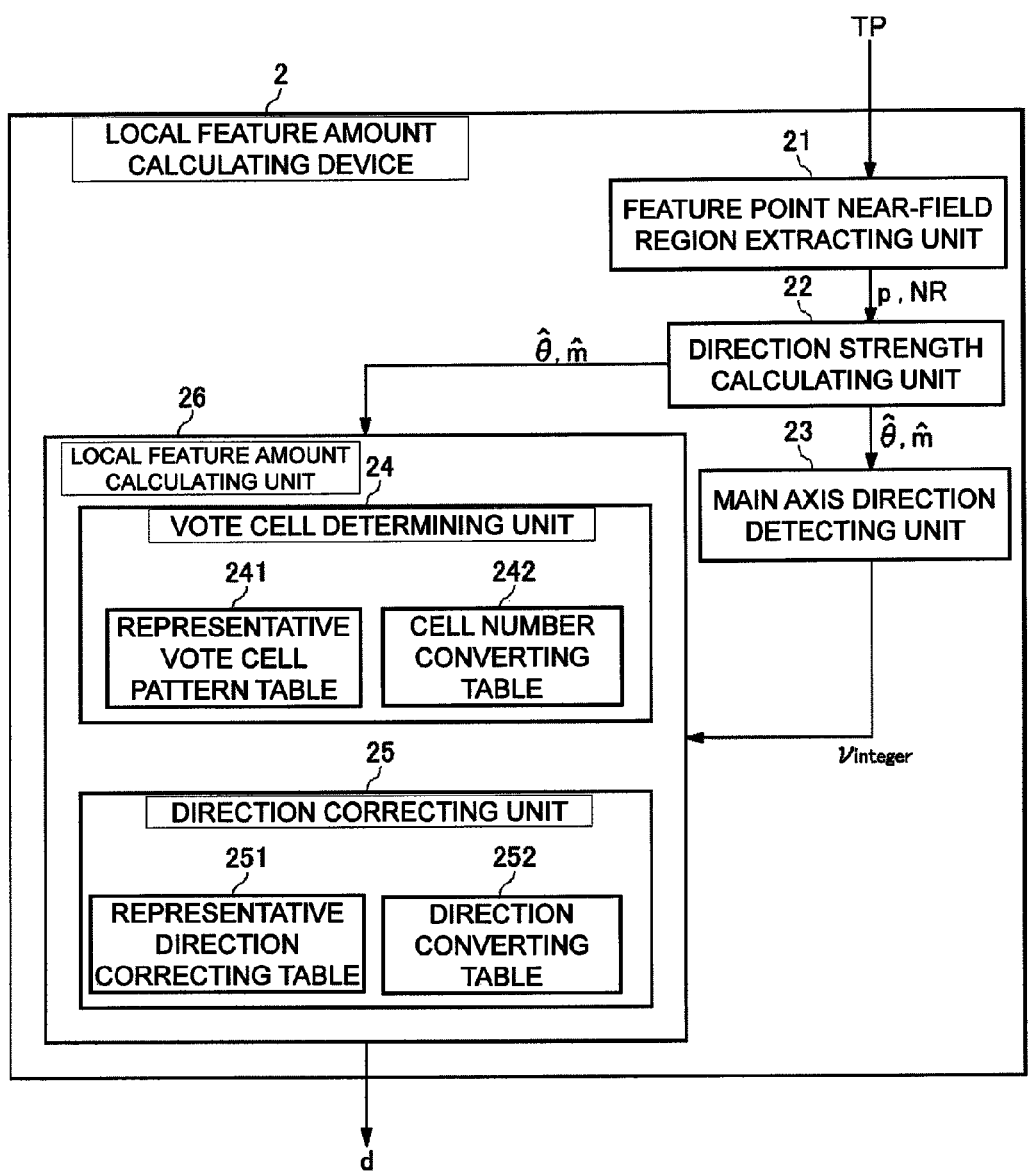
FIG. 10 is a block diagram illustrating the configuration of a local feature amount calculating device according to a second embodiment of the invention.

FIG. 10 is a block diagram illustrating the configuration of a local feature amount calculating device according to a second embodiment of the invention. The local feature amount calculating device 2 according to this embodiment includes: a feature point near-field region extracting unit 21; a direction strength calculating unit 22; a main axis direction detecting unit 23; and a local feature amount calculating unit 26. In the local feature amount calculating device 2, the configuration illustrated in FIG. 10 may be realized by hardware, or the configuration illustrated in FIG. 10 may be realized by mounting software in an operation processing device.

The feature point near-field region extracting unit 21, similarly to the feature point near-field region extracting unit 11 according to the first embodiment, extracts feature points p from an input image TP and sets a near-field region NR for each feature point p. The direction strength calculating unit 22, similarly to the direction strength calculating unit 12 according to the first embodiment, calculates an edge gradient direction $\theta(x, y)$ and an edge strength $m(x, y)$ as the "direction", and the "strength of the direction" by differentiating each pixel located within the near-field region NR in the x and y directions.

In the first embodiment, although the main axis direction detecting unit 13 quantizes the edge gradient directions $\theta(x, y)$ of pixels located within the near-field region NR that are acquired by the direction strength calculating unit 22 by using Equation (6), in this embodiment, the direction strength calculating unit 22 performs the quantization, and the direction strength calculating unit 22 outputs the quantized edge gradient directions $\hat{\theta}(x, y)$ to the main axis direction detecting unit 23 and the local feature amount calculating unit 26. The direction strength calculating unit 22, similarly to the direction strength calculating unit 12 according to the first embodiment, acquires weighted edge strengths $\hat{m}(x, y)$ and outputs the weighted edge strengths to the main axis direction detecting unit 23 and the local feature amount calculating unit 26.

The main axis direction detecting unit 23 acquires the quantized edge gradient directions $\hat{\theta}(x, y)$ quantized by the direction strength calculating unit 22 and the weighted edge strengths $\hat{m}(x, y)$ and acquires a histogram $h(k)$ of the edge gradient directions by using Equations (8) and (9). Then, the main axis direction detecting unit 23 sets the peak of the histogram $h(k)$ as the main axis direction vinteger (see FIG. 5). The main axis direction vinteger has any integer value in the range 0 to N−1, that is, a discrete value. In addition, the main axis direction detecting unit 23 may convert the integer value into a value in radians. Even in such a case, the value in radians as the main axis vinteger is a discrete value. The main axis direction detecting unit 23 outputs the main axis vinteger as a discrete value to the local feature amount calculating unit 26.

The local feature amount calculating device 2 according to this embodiment, when being compared with the local feature amount calculating device 1 according to the first embodiment, does not include the vote cell pattern generating unit 14 and the direction correcting pattern generating unit 15 according to the first embodiment. The reason for this is that, in this embodiment, a main axis direction is detected by the main axis direction detecting unit 23 as a discrete value, accordingly, the rotated vote cell pattern or the direction correcting pattern can be formed as a table, and therefore, unlike the first embodiment, the rotated vote cell pattern or the direction correcting pattern does not need to be generated (calculated) based on the detected main axis direction each time. The local feature amount calculating unit 26 according to this embodiment includes a vote cell determining unit 24 and a direction correcting unit 25 therein.

First, the vote cell determining unit 24 will be described. The vote cell determining unit 24 determines a vote cell pattern in accordance with the main axis vinteger acquired from the main axis direction detecting unit 23 and acquires a vote cell number corresponding to the position of a pixel of interest by referring to the determined vote cell pattern.

Figure 11:
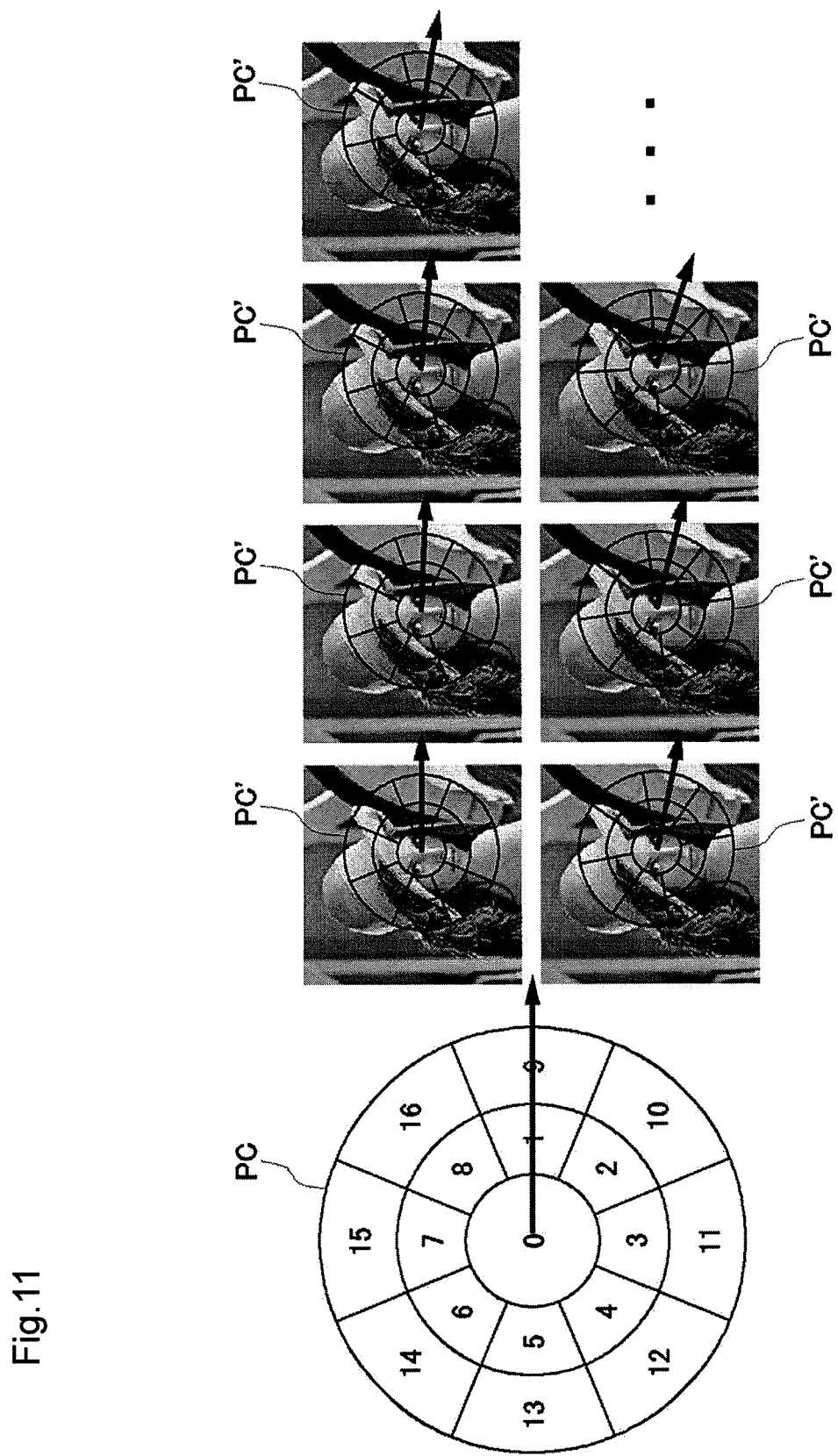
FIG. 11 is a diagram illustrating vote cell patterns, which corresponds to each direction of the main axis, according to the second embodiment of the invention.

FIG. 11 illustrates a reference vote cell pattern PC and rotated vote cell patterns PC' corresponding to each main axis direction vinteger. The vote cell patterns have the same shape as that of the vote cell patterns illustrated in FIGS. 6A and 6B, and there are 17 vote cells 0 to 16. The method of giving the cell number is the same as that illustrated in FIGS. 6A and 6B.

As described above, the main axis direction vinteger has a discrete value in the range of 0 to N−1, the kinds thereof are limited (0 to N−1), and accordingly, the kinds of the rotated vote cell patterns corresponding thereto are limited (0 to N−1). Accordingly, in a case where the limited rotated vote cell patterns are formed as a table, when the main axis direction vinteger is given, a rotated vote cell pattern rotated in correspondence with the main axis direction vinteger can be acquired by reading out a vote cell pattern from the table.

Figure 12:
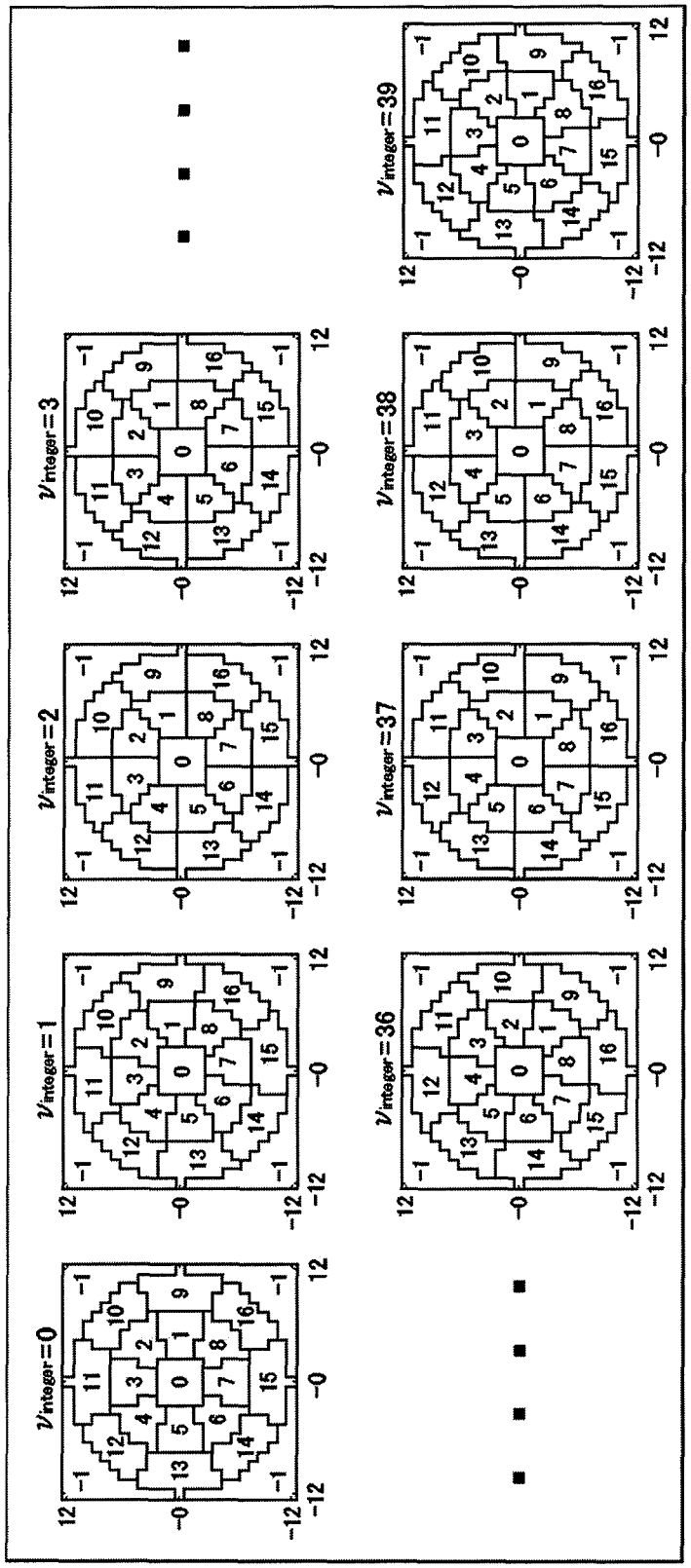
FIG. 12 is a diagram illustrating a vote cell pattern table according to the second embodiment of the invention.

FIG. 12 is a diagram illustrating an example of the vote cell pattern. FIG. 12 illustrates a case where N=40 and W=25. Each rotated vote cell pattern PC' has the same size as the size W×W=(25×25) of the near-field region NR. In other words, to each pixel within W×W, the number of a vote cell to which the pixel belongs to is given. In addition, a cell number "−1" is given to the outside of the circle, and a vote is not given to the outside of the circle. In the example illustrated in FIG. 12, one vote cell is assigned to one pixel.

By storing the vote cell pattern table illustrated in FIG. 12 in the vote cell determining unit 24, when the main axis direction vinteger is given from the main axis direction detecting unit 23, the vote cell determining unit 24 selects a rotated vote cell pattern corresponding to the main axis direction vinteger and determines a vote cell in accordance with the coordinates of each pixel.

In a case where the reference vote cell pattern has a shape having point symmetry, when the reference vote cell pattern is rotated by a predetermined step width, the rotated vote cell pattern having the same pattern periodically appears. Accordingly, in such a case, by using a cell number converting table, the vote cell pattern table can be compressed.

In this embodiment, since the vote cell pattern has point symmetry, and the number of steps N=40, a rotated vote cell pattern having the same shape periodically appears every 45 degrees (every five steps). Accordingly, the vote cell pattern table can be compressed. In other words, the vote cell patterns of the main axes vinteger=5 to 39 can be represented by using the vote cell patterns of the main axes vinteger=0 to 4, and accordingly, the vote cell pattern table can be compressed to ⅛. For example, the vote cell patterns of the main axes vinteger=5 to 9 can be represented by using Equation (15) using the vote cell patterns of the main axes vinteger=0 to 4.

$$\text{voting\_cell\_pattern}_{v_{integer}+5}(x,y) = \text{compress}_A(\text{voting\_cell\_pattern}_{v_{integer}}(x,y)) \quad (15)$$

Figure 13:
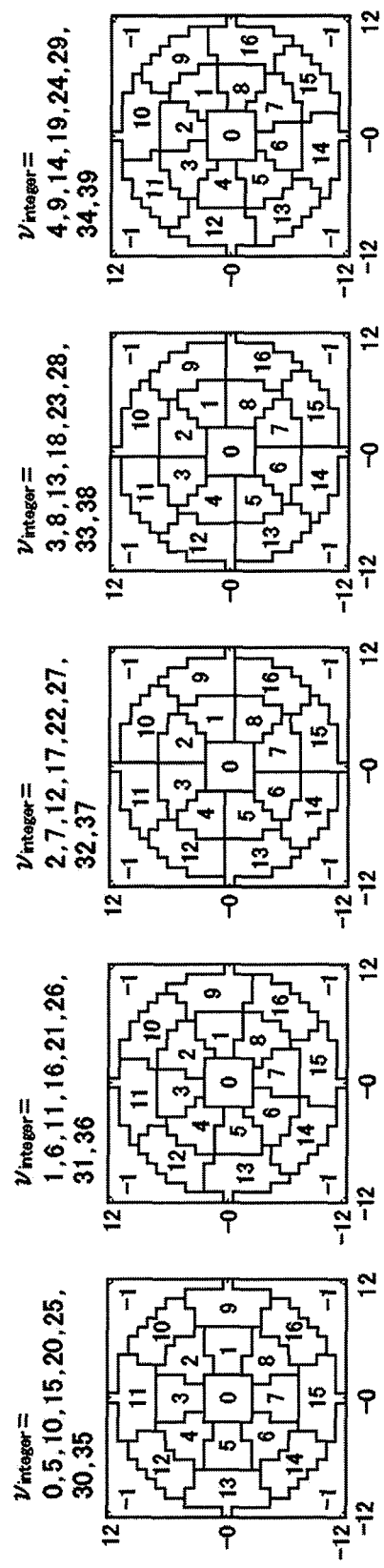
FIG. 13 is a diagram illustrating a compressed vote cell pattern table according to the second embodiment of the invention.

Thus, according to this embodiment, in the vote cell determining unit 24, actually, as illustrated in FIG. 10, a representative vote cell pattern table 241 is disposed, and, as illustrated in FIG. 13, and only the vote cell patterns of the main axes vinteger=0 to 4 illustrated in FIG. 11 are stored as representative cell patterns. In other words, in the representative cell pattern table 241, only a plurality of the representative cell patterns of which the shapes are unique is stored. In this embodiment, five kinds of the rotated vote cell patterns corresponding to the main axis directions vinteger=0, 1, 2, 3, 4 are the representative vote cell patterns. In addition, in the vote cell determining unit 24, the cell number converting table (compressA) 242 illustrated in FIG. 14 is further stored.

When a main axis direction vinteger is given, the vote cell determining unit 24, first, selects a representative vote cell pattern corresponding to the main axis direction vinteger out of the representative cell patterns of five kinds by referring to the vote cell pattern table 241 illustrated in FIG. 13. Then, the vote cell determining unit 24 acquires a cell number of a vote cell to which the coordinates of a pixel of interest belongs based on the representative vote cell pattern. Next, the vote cell determining unit 24 converts the acquired cell number of the vote cell by referring to a compression converting table 242 illustrated in FIG. 13.

For example, in a near-field region of which the main axis direction vinteger=18, for a pixel of interest that has coordinates of (−4, 2) and has a feature point as its center, since the main axis direction vinteger is "18", a representative vote cell pattern located fourth from the left side in FIG. 13 is selected, and a cell number "4" is acquired based on the coordinates of the pixel of interest as (−4, 2). The cell number "4" is converted into "1" by referring to the fourth row and the fifth column of the cell number converting table 242 illustrated in FIG. 14. Therefore, the vote cell of the pixel of interest is determined to be a vote cell 1.

In addition, in a case where the first quadrant, the second quadrant, the third quadrant, and the fourth quadrant have similar figures, the vote cell pattern table illustrated in FIG. 12 can be compressed to ¼ with the similar figures being taken into account.

Next, the direction correcting unit 25 will be described. The direction correcting unit 25 corrects the edge gradient direction by using the quantized edge gradient direction θhat (x, y) of each pixel located within the near-field region, which is acquired from the direction strength calculating unit 22 and the main axis direction vinteger acquired from the main axis direction detecting unit 23.

As described above, in this embodiment, the main axis direction vinteger has a discrete value in the range of 0 to N−1, the kinds thereof are limited (0 to N−1), and the edge gradient direction θhat(x, y) has a discrete value, whereby a corrected edge gradient direction corresponding to a combination of the main axis direction vinteger and the edge gradient direction θhat (x, y) can be formed as a table. By preparing such a table, when a main axis direction vinteger is given, a corrected edge gradient direction corrected in accordance with the main axis direction vinteger can be acquired by reading out the edge gradient direction from the table.

Figure 15:
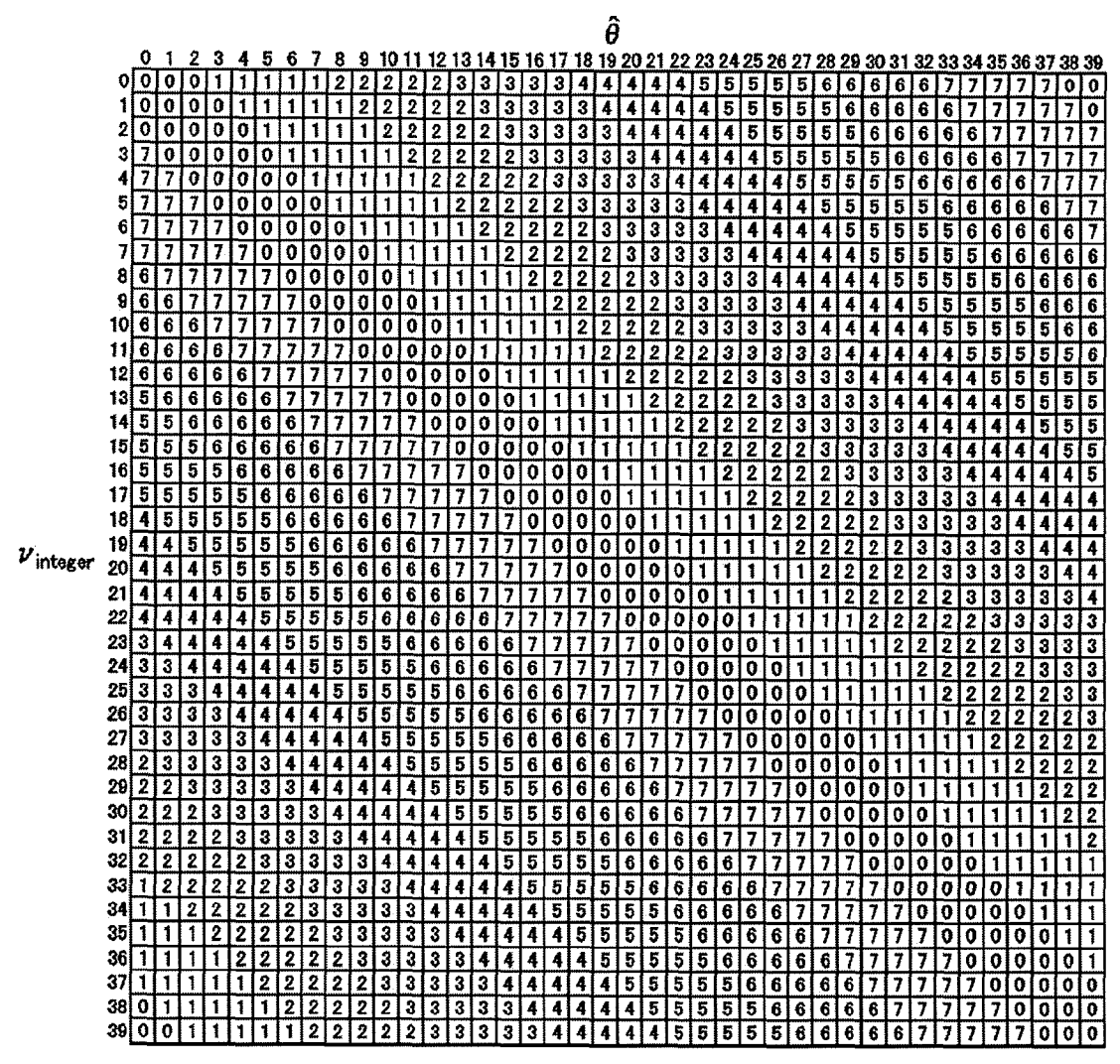

FIG. 15 is a diagram illustrating an example of a direction correcting table. FIG. 15 illustrates a case where N=40. By storing the direction correcting table illustrated in FIG. 15 in the direction correcting unit 25, when a main axis direction vinteger and the quantized edge gradient direction θhat(x, y) are given, the direction correcting unit 25 can acquire one of eight directions 0 to 7 as the corrected edge gradient direction by referring to the direction correcting table illustrated in FIG. 15.

As can be understood based on FIG. 15, in the direction correcting table, a change in the corrected edge gradient direction with respect to the edge gradient direction θhat(x, y) has periodicity. Accordingly, by using this periodicity, the table can be compressed. Since N=40 in this embodiment, by using a compression converting table, the direction correcting table illustrated in FIG. 15 can be compressed to ⅛. In other words, the edge gradient direction (0 to 7) in a case where the main axis vinteger=5 to 40 can be acquired from a portion, which is for a case where the main axis vinteger=0 to 4, of the table. For example, a case where the main axis vinteger=5 to 9 can be represented by Equation (16) by using a portion, which is for a case where the main axis vinteger=0 to 4, of the table.

$$\text{direction\_offset}_{v_{integer}+5}(\hat{\theta}) = \text{compress}_B(\text{direction\_offset}_{v_{integer}}(\hat{\theta})) \quad (16)$$

Figure 16:
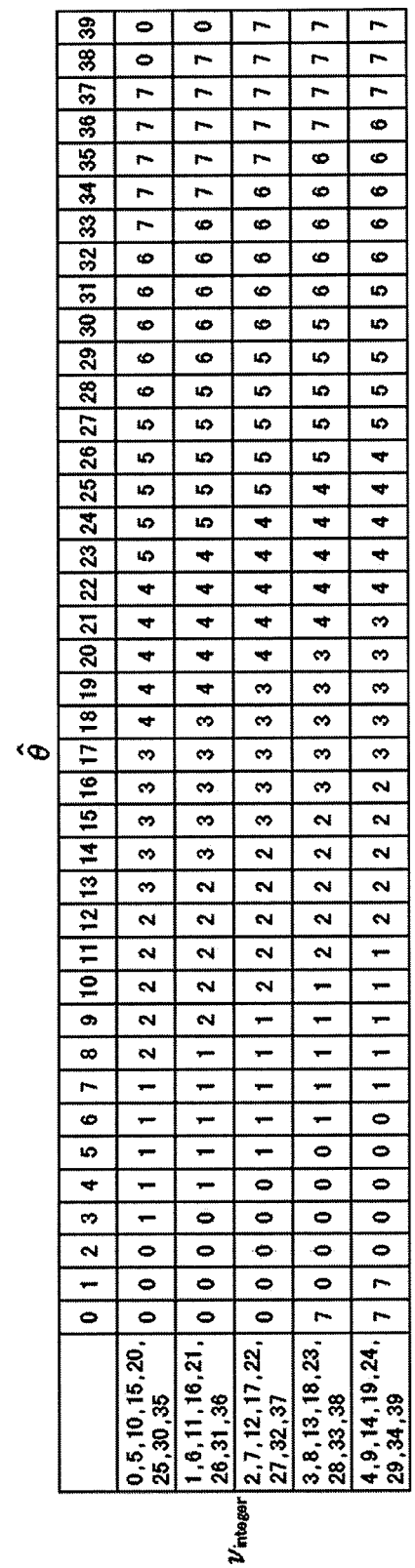
FIG. 16 is a diagram illustrating a compressed direction correcting table according to the second embodiment of the invention.

Thus, in this embodiment, actually, a representative direction correcting table 251 is disposed in the direction correcting unit 25 as illustrated in FIG. 10, and, in this representative direction correcting table 251, as illustrated in FIG. 16, only a portion, which is used for the main axis directions vinteger=0 to 4, of the table illustrated in FIG. 15 is defined as the representative corrected edge gradient directions as illustrated in FIG. 16. In other words, in the representative direction correcting table 251, main axis directions (for example, the main axis directions vinteger=0, 5, 10, 15, 20, 25, 30, and 35) in which the corrected edge gradient direction with respect to the edge gradient direction θhat (x, y) has the same period are regarded as one group, and only a representative corrected edge gradient direction of one row is defined for each group. In this embodiment, the corrected edge gradient directions (the first to fifth rows in FIG. 15) corresponding to the main axis directions vinteger=0, 1, 2, 3, and 4 are defined in the representative direction correcting table 251 as the representative corrected edge gradient directions. In addition, in the direction correcting unit 25, a direction converting table (compressB) 252 illustrated in FIG. 17 is further stored.

When the main axis vinteger and the quantized edge gradient direction θhat (x, y) are given, the direction correcting unit 25 acquires one of directions 0 to 8 by referring to the representative direction correcting table 251 illustrated in FIG. 16 and acquires a corrected edge gradient direction by converting the acquired direction by using the direction converting table 252 illustrated in FIG. 17. For example, for a pixel of interest having a main axis vinteger=18 and an edge gradient direction θhat(x, y)=10, "1" is acquired from the fourth row and the eleventh column of the representative direction correcting table 251 illustrated in FIG. 16, and, next, "6" is acquired as a corrected edge direction gradient from the fourth-row and the second column of the direction converting table 252 illustrated in FIG. 16. The direction correcting unit 25, as described above, acquires one of directions 0 to 7 as the corrected edge gradient direction for each pixel located in the near-field region NR.

When the vote cell is determined by the vote cell determining unit 24, and the corrected edge gradient direction is acquired by the direction correcting unit 25, the local feature amount calculating unit 26 gives a vote of the edge strength of the pixel. The local feature amount calculating unit 26 acquires a local feature amount d=(d0, d1, . . . , d135)T by performing such a voting process for all the pixels located in the near-field region NR. When the local feature amount di is represented as an equation, it is as represented in Equation (17).

$$d_i = \sum_{(x,y)^T \in S_i} \hat{m}(x, y) \tag{17}$$

Here, Si represented in Equation (17) is given by Equation (18).

$$S_i = \{(x, y)^T \mid \text{voting\_cell\_pattern}_{v_{integer}}(x, y)^T \geq 0, \tag{18}$$

$$\text{index}(x, y)^T = i \text{ and } (x, y)T \text{ is located within}$$

$$\text{the near-field region of a feature point } p\}$$

Here, index (x, y) represented in Equation (18) is given by Equation (19)

$$\text{index}(x,y) = 8 \times \text{votiong\_cell\_pattern}_{v_{integer}}(x,y) + \text{direction\_offset}_{v_{integer}}(\theta(x,y)) \tag{19}$$

Figure 18:
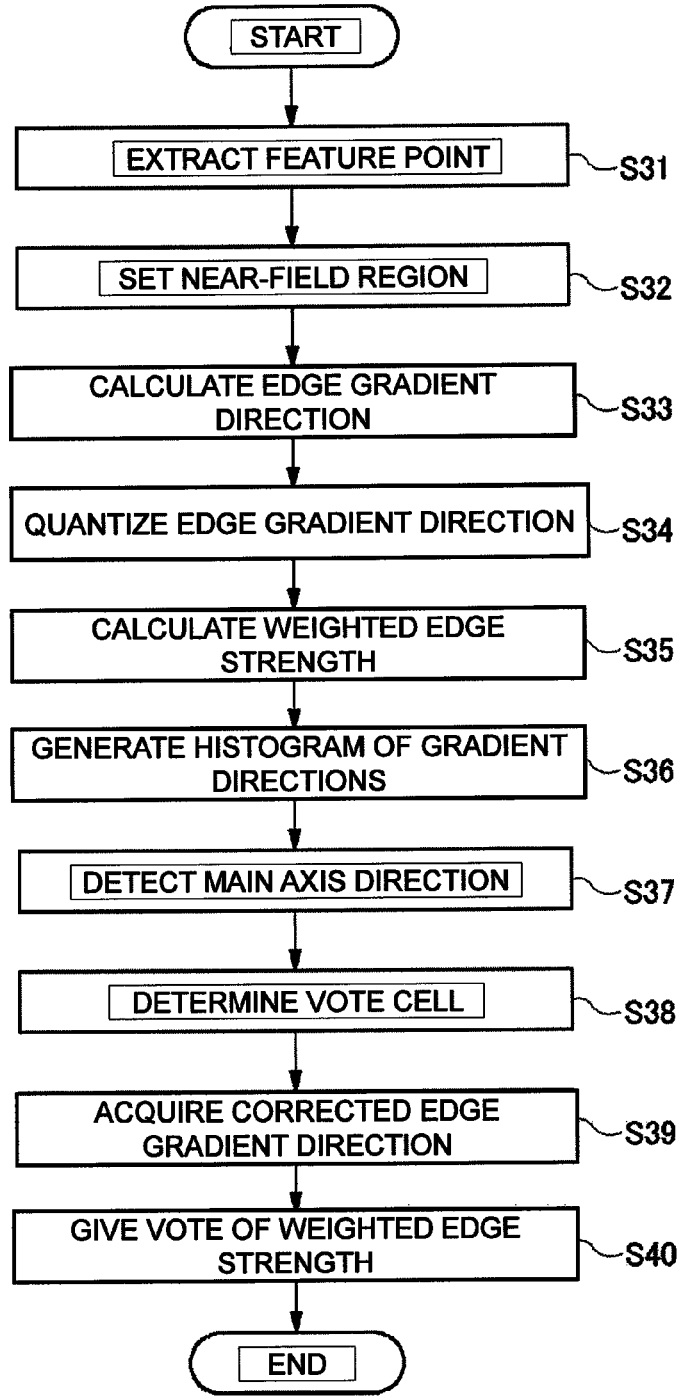
FIG. 18 is a flow diagram illustrating a method of calculating the local feature amount according to the second embodiment of the invention.

Next, a method of calculating a local feature amount according to this embodiment will be described. According to the method of calculating a local feature amount of this embodiment, a local feature amount is calculated based on an input image. The method of calculating a local feature amount may be performed by the local feature amount device 2 configured by hardware, or may be performed by software (computer program) that configures the local feature amount calculating device 2 by being mounted in an operation processing device. FIG. 18 is a flow diagram illustrating the method of calculating a local feature amount according to this embodiment.

First, the feature point near-field region extracting unit 21 extracts a feature point p from the image TP in Step S31. Next, the feature point near-field region extracting unit 21 sets a near-field region NR near the feature point p in Step S32. Then, the feature point near-field region extracting unit 21 outputs the feature point p and the near-field region NR to the direction strength calculating unit 22. The direction strength calculating unit 22 calculates an edge gradient direction θ(x, y) for each pixel located within the near-field region NR by differentiating each pixel located within the near-field region NR in the x and y directions in Step S33 and quantizes the edge gradient direction so as to acquire a quantized edge gradient direction θhat(x, y) in Step S34. In addition, the direction strength calculating unit 22 calculates a weighted edge strength mhat(x, y) for each pixel located within the near-field region NR in Step S35. Here, one of the process of Step S33 and the following processes of Step S34 and Step S35 may be performed first, or the processes may be performed in parallel with each other.

Next, the main axis direction detecting unit 23 generates a histogram of edge gradient directions by giving votes of the weighted edge strength mhat(x, y) to the quantized edge gradient directions θhat(x, y) of the pixels located within the near-field region NR in Step S36. The main axis direction detecting unit 23 detects an edge gradient direction (a discrete value) having the local maximum value in the histogram of the gradient directions as a main axis direction vinteger of the near-field region NR and outputs the main axis direction to the local feature amount calculating unit 26 in Step S37.

To the local feature amount calculating unit 26, the quantized edge gradient direction θhat(x, y) and the weighted edge strength mhat(x, y) are input from the direction strength calculating unit 22, and the main axis direction vinteger is input from the main axis direction detecting unit 23. The local feature amount calculating unit 26 determines a vote cell to which a pixel of interest belongs in a vote cell pattern corresponding to the main axis direction vinteger by referring to the vote cell pattern table for each pixel located within the near-field area NR in Step S38.

In addition, in a case where the vote cell pattern table illustrated in FIG. 12 is stored in the vote cell determining unit 24, the local feature amount calculating unit 26 determines a vote cell by referring to the vote cell pattern table in Step S38. On the other hand, in a case where the representative vote cell pattern table 241 illustrated in FIG. 13 and the cell number converting table 242 illustrated in FIG. 14 are stored in the vote cell determining unit 24 (in the case illustrated in FIG. 10), in Step S38, the local feature amount calculating unit 26 determines a vote cell by referring to the representative cell pattern table 241 and the cell number converting table 242 as the vote cell pattern table.

The local feature amount calculating unit 26 acquires a corrected edge gradient direction corresponding to the main axis direction vinteger and the quantized edge gradient direction θhat(x,) by referring to the direction correcting table for each pixel located within the near-field area NR in Step S39.

In addition, in a case where the direction correcting table illustrated in FIG. 15 is stored in the direction correcting unit 25, in Step S39, the local feature amount calculating unit 26 acquires a corrected edge gradient direction by referring to the direction correcting table. On the other hand, in a case where the representative direction correcting table 251 illustrated in FIG. 16 and the direction converting table 252 illustrated in FIG. 17 are stored in the direction correcting unit 25 (in the case illustrated in FIG. 10), in Step S39, the local feature amount calculating unit 26 acquires a corrected edge gradient direction by referring to the representative direction correcting table 251 and the direction converting table 252. In addition, one of the process of Step S38 and the process of Step S39 may be performed first, or both thereof may be performed in parallel to each other.

Next, the local feature amount calculating unit 26, for each pixel located within the near-field area NR, gives a vote of the weighted edge strength mhat(x, y) of the pixel of interest in Step S40 along the corrected edge gradient direction acquired in Step S39 to the vote cell determined in Step S38, whereby a local feature amount d of the feature point p is acquired.

As described above, according to this embodiment, in order to realize rotation invariance, instead of rotating a texture pattern of a near-field region NR of a feature point p and then giving votes to cells of the vote cell patterns that have been newly set, unlike a conventional technique, votes are given to vote cells of the rotated vote cell pattern CP' rotated in accordance with the main axis direction, and accordingly, no linear interpolating process in units of sub pixels accompanying a large amount of floating-point calculation performed for rotating the texture pattern is necessary, whereby the calculation of a local feature amount can be performed at high speed.

In addition, as described above, in order to realize the rotation invariance, instead of rotating the texture pattern, after the direction of each pixel is corrected, votes are given to the rotated reference vote cell patterns, and accordingly, it is not necessary to calculate the direction of each pixel and the strength of the direction again for the texture pattern after rotation, unlike the conventional technique, and accordingly, the edge gradient direction and the edge strength of each pixel that are calculated by the direction strength calculating unit 22 can be used also for detection of the main axis direction vinteger and for the calculation of the local feature amount. Accordingly, the differential value calculation performed for calculating the edge gradient direction and the edge strength of each pixel is completed once, and therefore the calculation of the local feature amount can be performed at high speed.

Furthermore, according to this embodiment, since the main axis direction vinteger is acquired as a discrete value, the rotated vote cell pattern corresponding to each main axis direction can be prepared in advance so as to form a table, and, by using such a table, when the main axis direction vinteger is acquired, by selecting a rotated vote cell pattern corresponding to the main axis direction vinteger from the table, it is not necessary to acquire a vote cell pattern through calculation each time, whereby the process can be performed at high speed.

In addition, according to this embodiment, since the reference vote cell pattern has a point-symmetry shape, the vote cell pattern table can be compressed by using the periodicity, whereby a necessary memory capacity can be decreased. The table as represented in this embodiment can be stored in a cache of the CPU, whereby the process can be performed at higher speed.

Furthermore, according to this embodiment, a table can be prepared also for the edge gradient direction of pixels, and the edge gradient direction of each pixel is corrected by using the table, whereby the process can be performed at high speed.

In addition, according to this embodiment, since the corrected edge gradient direction has periodicity, the direction correcting table can be compressed, whereby a necessary memory capacity can be decreased. The table as represented in this embodiment can be stored in a cache of the CPU, whereby the process can be performed at higher speed.

Furthermore, according to the vote cell pattern of the above-described second embodiment, since the vote cells are set such that each pixel belongs to only one vote cell, the area of the same vote cell differs in accordance with a difference in the rotation angle of the rotated vote cell pattern. For example, referring to FIG. 12, while the area of the vote cell 1 for the main axis direction vinteger=0 corresponds to 21 pixels, the area of the vote cell 1 for the main axis direction vinteger=1 corresponds to 20 pixels, and both areas of the same vote cell are slightly different from each other in accordance with a difference in the rotation angle of the rotated vote cell pattern. Then, in cases where the main axis directions are different from each other even in the same image, the number of pixels for giving votes of the edge strength to the same cell is relatively large in one case, and the number of pixels for giving votes of the edge strength to the same cell is relatively small in the other case, whereby an error occurs in the accumulated value of the vote cell.

In consideration of this point, the local feature amount calculating unit 26 may give votes while further weighting the weighted edge strength in accordance with the size of the vote cell. For example, a reciprocal of the area may be used as the weight. In such a case, a local feature amount that is not effected by a difference in the area of the vote cell due to a difference in rotation angle can be acquired.

In addition, in the vote cell pattern according to the above-described second embodiment, since the vote cells are set such that each pixel belongs to only one vote cell, an error occurs near the boundary of vote cells in accordance with a difference in the rotation angle of the rotated vote cell pattern.

Figure 19:
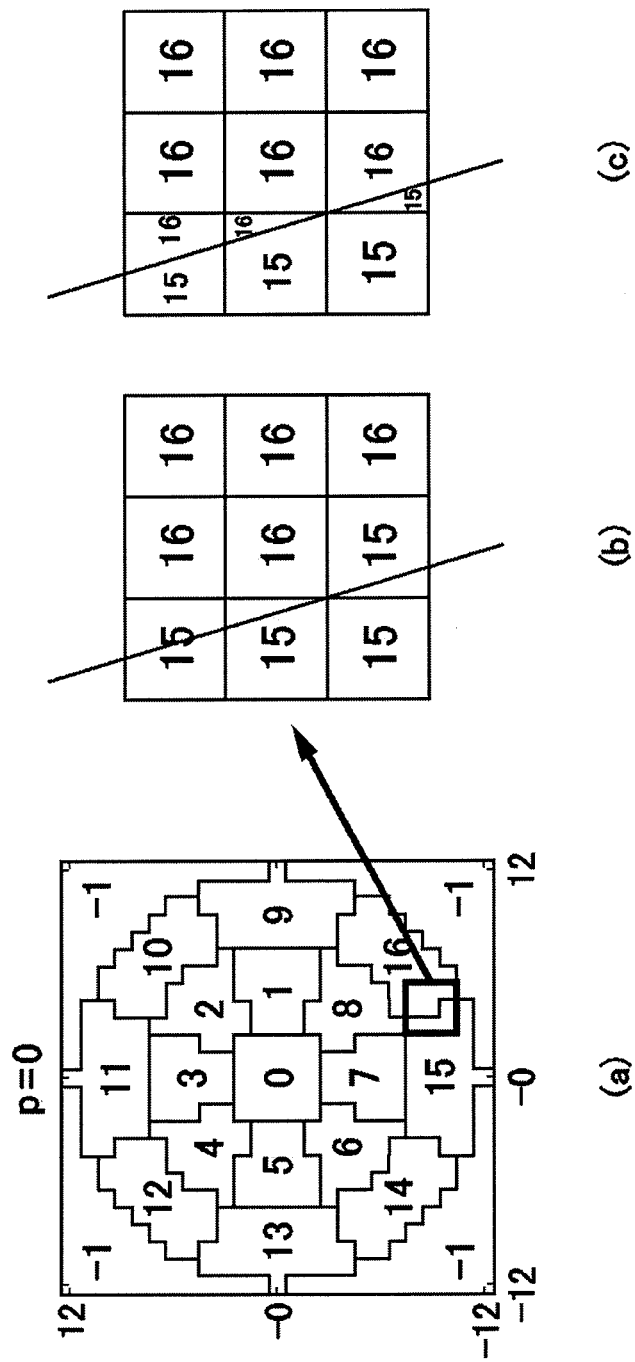
FIGS. 19A to 19C are diagrams illustrating a process of giving votes to a plurality of vote cells for one pixel according to the second embodiment of the invention.

In consideration of this point, it may be configured such that a vote cell pattern is drawn with a solid line for pixels located on the boundary of vote cells as illustrated in FIG. 19C, and, for a pixel hanging at the solid line, the local feature amount calculating unit 26 gives votes to a plurality of vote cells in accordance with the area divided by the solid line. FIG. 19A is a rotated vote cell pattern for the main axis direction vinteger=0, which is illustrated in FIG. 12, and FIGS. 19B and 19C are diagrams acquired by enlarging a part (a boundary portion between the vote cell 15 and the vote cell 16) thereof. FIG. 19B is an example in which an error is not considered, and FIG. 19C is an example in which an error is alleviated.

In FIG. 19C, for example, 60% of a pixel located on the upper left side belongs to a vote cell 15, and 40% thereof belongs to a vote cell 16. Accordingly, for this cell, a vote of 60% of the weighted edge strength mhat(x, y) is given to the vote cell 15, and a vote of 40% thereof is given to the vote cell 16. As above, by configuring one pixel to belong to a plurality of vote cells, an accurate vote value can be acquired regardless of the rotation angle of the rotated vote cell pattern.

Third Embodiment

Figure 20:
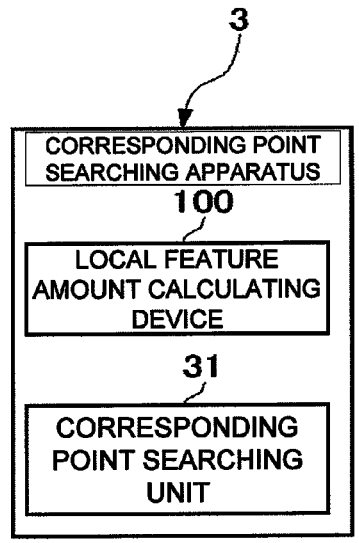
FIG. 20 is a block diagram illustrating the configuration of a corresponding point searching apparatus according to a third embodiment of the invention.

Next, a corresponding point searching apparatus using the local feature amount calculating device according to the first or second embodiment will be described as a third embodiment. FIG. 20 is a block diagram illustrating the configuration of the corresponding point searching apparatus 3 according to the third embodiment. As illustrated in FIG. 20, the corresponding point searching apparatus 3 includes a local feature amount calculating device 100 and a corresponding point searching unit 31. In the corresponding point searching apparatus 3, the configuration illustrated in FIG. 20 may be realized by hardware, or the configuration illustrated in FIG. 20 may be realized by mounting software in an operation processing device.

As the local feature amount calculating device 100, either the local feature amount calculating device 1 according to the first embodiment or the local feature amount calculating device 2 according to the second embodiment is used. First and second images are input to the local feature amount calculating device 100, and a local feature amount is calculated for each image and output to the corresponding point searching unit 31. The corresponding point searching unit 31 searches for feature points by comparing the local feature amount of the first image and the local feature amount of the second image.

In addition, the corresponding point searching apparatus 3 can be applied as a device that searches for corresponding points of an input image and an image stored in an image database in a system used for searching for an image, can be used as a device that searches for corresponding points of first and second images in a system used for reconstructing a three-dimensional image from the first and second images photographed at different time points, and can be further applied to the other systems.

Figure 21:
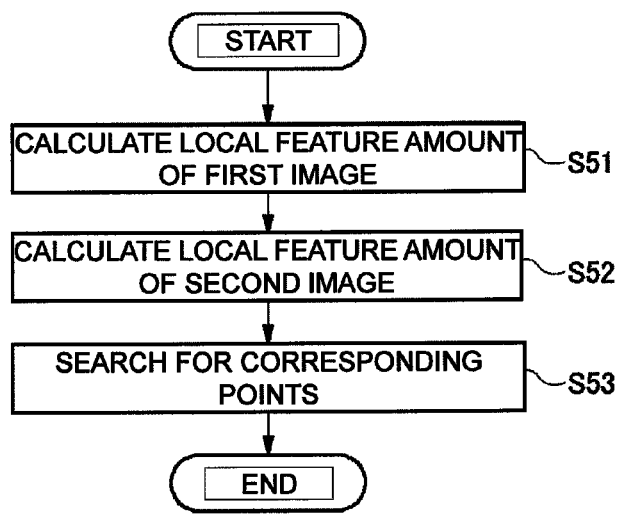
FIG. 21 is a flow diagram illustrating a method of searching for corresponding points according to the third embodiment of the invention.
Figure 22:
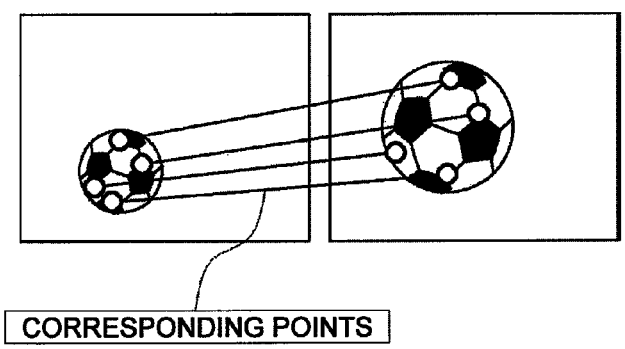
FIG. 22 is a diagram illustrating corresponding points of two images.
Figure 23:
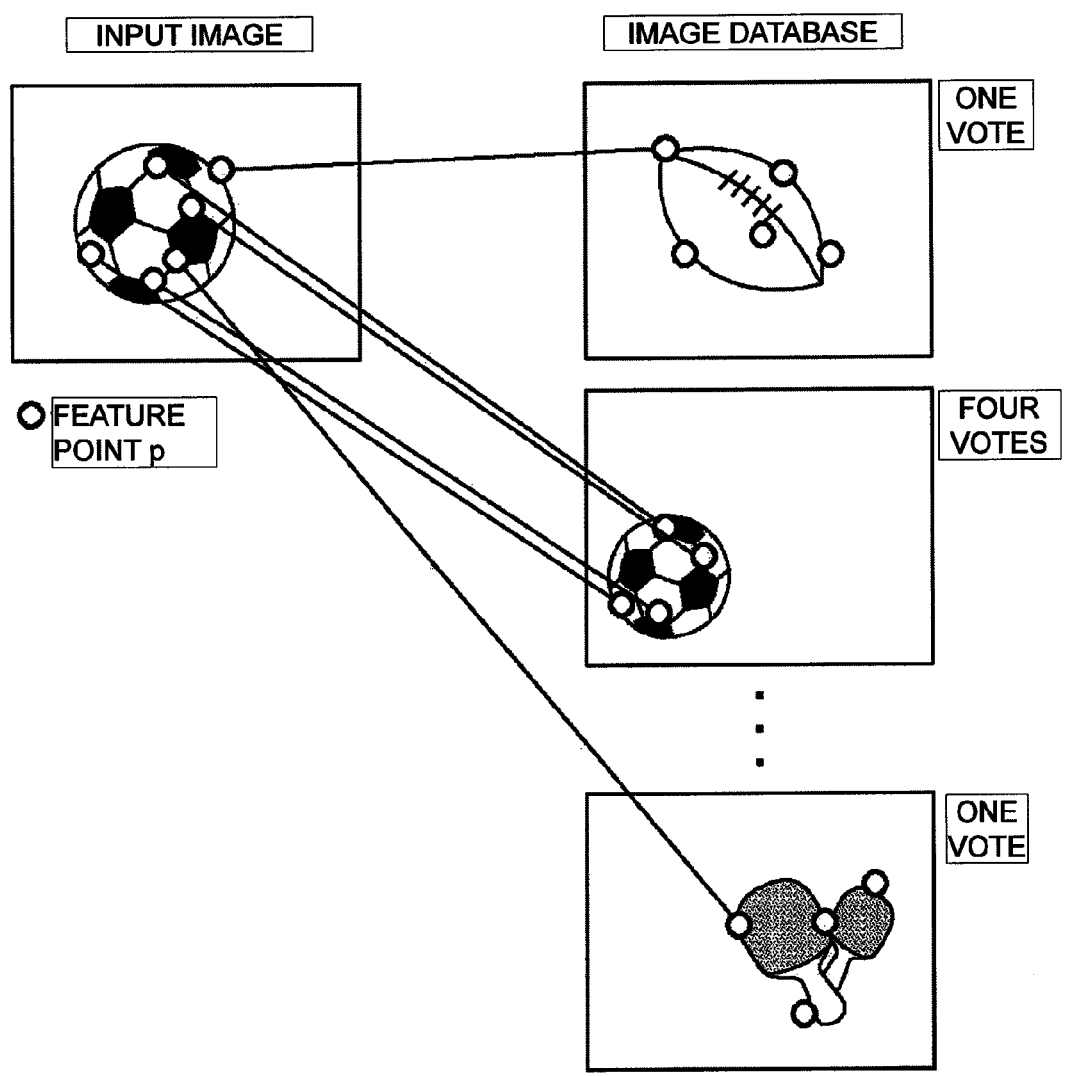
FIG. 23 is a diagram illustrating an image search using a local feature amount.
Figure 24:
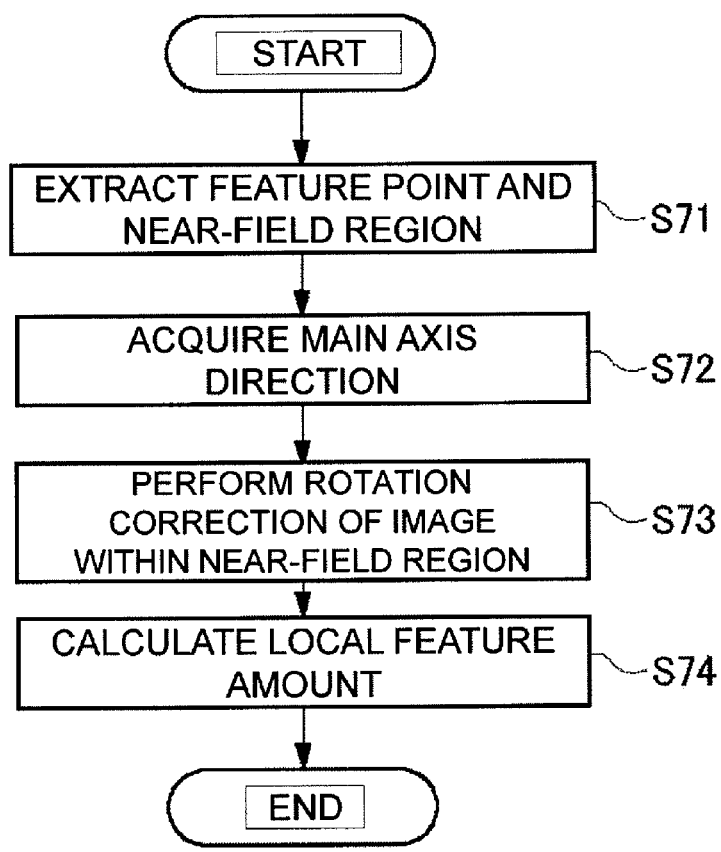
FIG. 24 is a flow diagram illustrating a process of calculating a local feature amount according to a SIFT.
Figure 25:
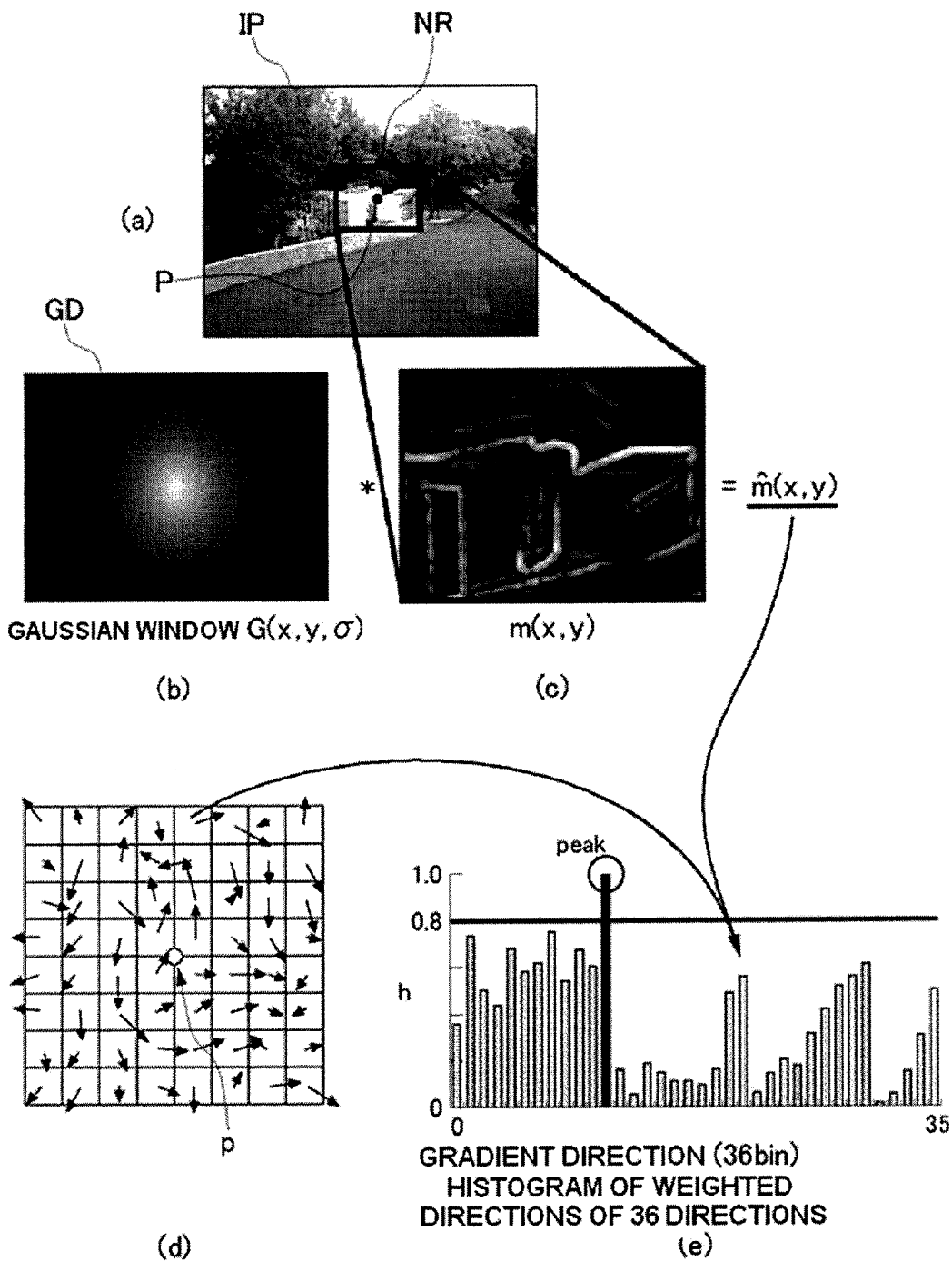
FIGS. 25A to 25E are diagrams illustrating the process of calculating a local feature amount according to the SIFT.
Figure 26:
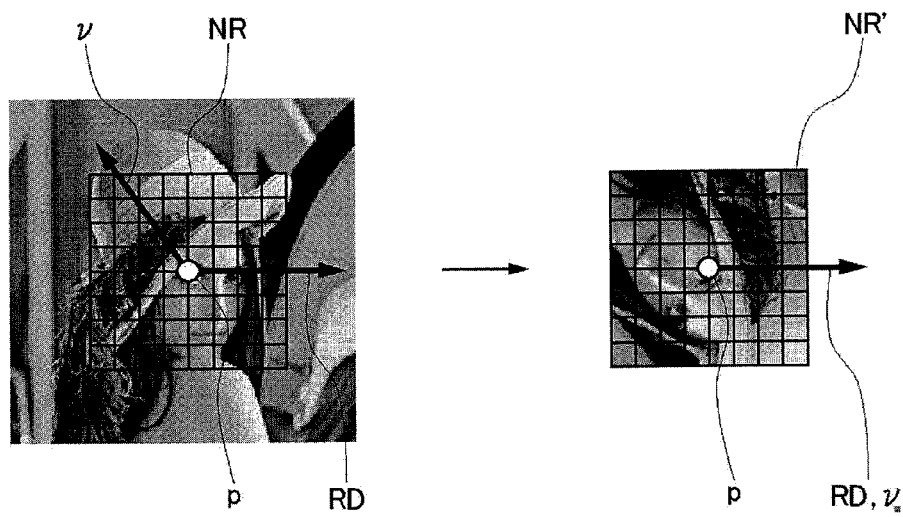
FIG. 26 is a diagram illustrating the process of calculating a local feature amount according to the SIFT.
Figure 27:
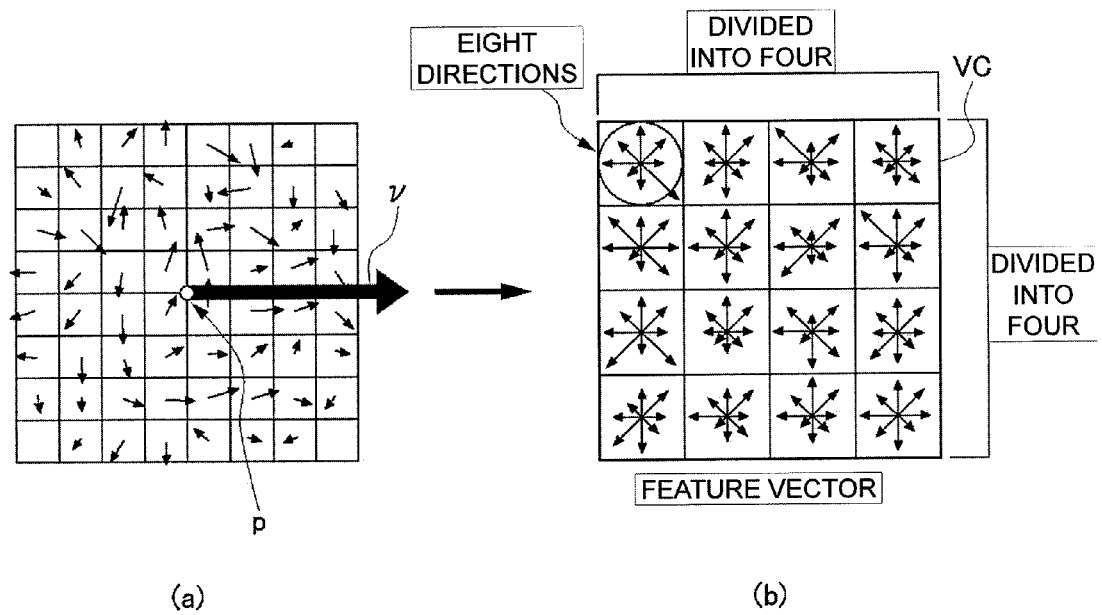
FIGS. 27A and 27B are diagrams illustrating the process of calculating a local feature amount according to the SIFT.

FIG. 21 is a flow diagram illustrating a method of searching for corresponding points according to this embodiment. The method of searching for corresponding points may be used by the corresponding point searching apparatus 3 that is configured by hardware or may be used by software (computer program) that configures the corresponding point searching apparatus 3 by being mounted in an operation processing device.

In the searching for corresponding points, first, the local feature amount calculating device 100 calculates the local feature amount of the first image in Step S51 and then calculates the local feature amount of the second image in Step S52. In Step S51 and Step S52, either the method of calculating a local feature amount according to the first embodiment or the method of calculating a local feature amount according to the second embodiment may be used. Next, the corresponding point searching unit 31 searches for corresponding points by comparing the local feature amount of the first image and the local feature amount of the second image in Step S53.

As above, according to the first to third embodiments, in order to realize rotation invariance in the calculation of a local feature amount, instead of rotating a texture pattern of near-field region of a feature point and then giving votes to cells of vote cell patterns that have been newly set, vote cell patterns are rotated, and votes are given to vote cells of the rotated vote cell pattern (rotated vote cell pattern), and accordingly, no linear interpolating process in units of sub pixels accompanying a large amount of floating-point calculation performed for rotating the texture pattern is necessary so as to increase the processing speed, whereby the process of searching for corresponding points can be performed at high speed.

In addition, according to the first to third embodiments, the algorithm is simpler than the SIFT and the SURF that are conventional local feature amount calculating algorithms, and accordingly, the scale of the circuit can be small when the local feature amount calculating device is formed as hardware, whereby the cost can be reduced. In addition, even in a case where the local feature amount calculating device is mounted as software, the executable binary size can be small, and accordingly, there is an advantage of easily building it into various applications. Accordingly, in a case where the local feature amount calculating device according to the above-described embodiment is formed as hardware or is mounted as software, it can be appropriately mounted in a mobile device or a low-end device.

Furthermore, in the above-described embodiments, the "direction" and the "strength of the direction" of a pixel is not limited to being based on the edge information. Thus, the "direction" and the "strength of the direction" may be acquired through a wavelet transformation or a Gabor transform. In addition, it may be configured such that the edge gradient directions and the edge strengths of a large quantity of images are formed as a database used for learning, and, the edge gradient direction and the edge strength are acquired by using the database in a case where a new image is input.

In addition, in the above-described embodiments, it may be configured such that the weight at the time of acquiring the weighed edge strength mhat(x, y) is set as w(x, y)=1, local feature amounts of a plurality of images are acquired, and the weight w(x, y) is determined again based on the statistics acquired from the local feature amounts. For example, in a case where there is a tendency in which strong values are concentrated in a specific vote cell, by decreasing the weight of the portion, the contribution ratio of each vote cell can be adjusted.

In addition, in the above-described embodiments, although the main axis direction is detected based on the image information (the edge gradient direction and the edge strength image), the main axis direction is not limited thereto and may be detected based on a detection value detected by a gyro sensor, a geomagnetic sensor, or a gravity sensor that is included in an imaging device at the time of generation. Furthermore, it may be configured such that the main axis directions of a large quantity of images are formed as a database used for learning, and, the main axis direction is detected by using the database in a case where a new image is input.

The present invention has an advantage of increasing the speed of calculation of local feature amounts and is useful as a local feature amount calculating device and a method of calculating a local feature amount, which are used for calculating the local feature amount of an image, a corresponding point searching apparatus using the local feature amount calculating device, a method of searching for corresponding points using the method of calculating a local feature amount, and the like.

What is claimed is:

1. A local feature amount calculating device that calculates a local feature amount of an image, the local feature amount calculating device comprising:
   a feature point near-field region extracting unit that extracts a feature point and a near-field region that is set near the feature point from the image;
   a direction strength calculating unit that calculates a direction of each pixel located within the near-field region and a strength of the direction;
   a main axis direction detecting unit that detects a main axis direction of the near-field region; and
   a local feature amount calculating unit that acquires a local feature amount of the feature point by giving a vote of the strength of the direction of each pixel, which is calculated by the direction strength calculating unit, to a vote cell to which the pixel belongs out of vote cells of a rotated vote cell pattern that is acquired by rotating a reference vote cell pattern by an angle corresponding to the main axis direction along a corrected direction that is acquired by correcting the direction of the pixel that is calculated by the direction strength calculating unit in accordance with the main axis direction.

2. The local feature amount calculating device according to claim 1, wherein the main axis direction detecting unit detects the main axis direction of the near-field area based on directions of a plurality of the pixels located within the near-field region and the strengths of the directions that are calculated by the direction strength calculating unit.

3. The local feature amount calculating device according to claim 1, further comprising:
   a direction quantizing unit that quantizes the direction of the pixel,
   wherein the main axis direction detecting unit generates a direction histogram by giving a vote of the strength of the direction of the pixel along the direction of the pixel quantized by the direction quantizing unit, approximates a portion near a peak of the direction histogram as a curve, and detects a direction corresponding to a local maximum of a curve as the main axis direction.

4. The local feature amount calculating device according to claim 1, further comprising a vote cell pattern generating unit that generates the rotated vote cell pattern by rotating the reference vote cell pattern by an angle corresponding to the main axis direction.

5. The local feature amount calculating device according to claim 1, further comprising:
   a direction correcting pattern generating unit that is used for correcting the direction of the pixel, which is calculated by the direction strength calculating unit, in accordance with the main axis direction, wherein the local feature amount calculating unit acquires the corrected direction by correcting the direction of each pixel by using the direction correcting pattern.

6. The local feature amount calculating device according to claim 1, further comprising:

a direction quantizing unit that quantizes the direction of the pixel, wherein the main axis direction detecting unit generates a direction histogram by giving a vote of the strength of the direction of the pixel that is quantized by the direction quantizing unit along the direction of the pixel that is quantized by the direction quantizing unit and detects a direction which has a local maximum value in the direction histogram as the main axis direction.

7. The local feature amount calculating device according to claim 6, further comprising:

a vote cell pattern table in which a plurality of vote cell patterns acquired by rotating the reference vote cell pattern by a plurality of angles corresponding to a plurality of the main axis directions detected by the main axis direction detecting unit is stored, wherein the local feature amount calculating unit calculates the local feature amount by using a vote cell pattern corresponding to the main axis direction out of the vote cell patterns stored in the vote cell pattern table as the rotated vote cell pattern.

8. The local feature amount calculating device according to claim 6, further comprising:

a representative cell pattern table in which a plurality of representative vote cell patterns having unique shapes of the patterns out of a plurality of vote cell patterns acquired by rotating the reference vote cell pattern by a plurality of angles corresponding to a plurality of the main axis directions detected by the main axis detecting unit is stored; and a cell number converting table that is used for converting a cell number of the representative vote cell pattern along the main axis direction, wherein the local feature amount calculating unit determines a vote cell to which a vote of the strength of the direction is given by converting the cell number of the representative cell pattern corresponding to the main axis direction out of the representative vote cell patterns stored in the representative cell pattern table in accordance with the main axis direction by referring to the cell number converting table.

9. The local feature amount calculating device according to claim 6, further comprising:

a direction correcting table in which the corrected direction for a direction quantized by the direction quantizing unit is defined for each of a plurality of the main axis directions detected by the main axis direction detecting unit, wherein the local feature amount calculating unit acquires the corrected direction corresponding to the direction quantized by the direction quantizing unit along the main axis direction by referring to the direction correcting table.

10. The local feature amount calculating device according to claim 6, further comprising:

a representative direction correcting table in which the main axis directions, in which the corrected directions for the directions quantized by the direction quantizing unit have a same period, are set as one group out of a plurality of the main axis directions detected by the main axis direction detecting unit, and the representative corrected directions for the directions quantized by the direction quantizing unit are defined for each group; and a direction converting table that is used for converting the representative corrected direction of the representative direction correcting table along the main axis direction, wherein the local feature amount calculating unit acquires the corrected direction by converting the representative corrected directions corresponding to the main axis direction and the directions quantized by the direction quantizing unit along the main axis direction by referring to the direction converting table out of the representative corrected directions defined in the representative direction correcting table.

11. The local feature amount calculating device according to claim 1, wherein the local feature amount calculating unit gives a vote of the strength of the direction of the pixel to a plurality of vote cells in accordance with a ratio of each vote cell occupying the pixel in a case where the pixel belongs to the plurality of vote cells for each pixel.

12. The local feature amount calculating device according to claim 1, wherein the direction is an edge gradient direction of the pixel, and the strength of the direction is an edge strength of the pixel.

13. The local feature amount calculating device according to claim 1, wherein the local feature amount calculating unit gives a vote while weighting the strength of the direction in accordance with a size of the vote cell to which the vote of the strength of the direction is given.

14. The local feature amount calculating device according to claim 1, wherein the direction strength calculating unit calculates the strength of the direction while more heavily weighting the strength as the pixel is closer to the feature point.

15. A corresponding point searching apparatus that searches for corresponding points of a plurality of images, the corresponding point searching apparatus comprising:

the local feature amount calculating device according to claim 1; and a corresponding point searching unit that searches for the corresponding points of the plurality of images by comparing the local feature amounts of the plurality of images that are calculated by using the local feature amount calculating device with each other.

16. A computer-implemented method of calculating a local feature amount in which the local feature amount of an image is calculated, the method comprising:

extracting, using a processor, a feature point from the image;

setting, using the processor, a near-field area near the feature point;

calculating, using the processor, a direction of each pixel located within the near-field region;

calculating, using the processor, a strength of the direction of each pixel located within the near-field area;

detecting, using the processor, a main axis direction of the near-field area based on the direction of the plurality of pixels located within the near-field region and the strength of the direction;

acquiring, using the processor, a rotated vote cell pattern by rotating a reference vote cell pattern by an angle corresponding to the main axis direction;

acquiring, using the processor a corrected direction by correcting the direction of each pixel in accordance with the main axis direction; and acquiring, using the processor a local feature amount of the feature point for each pixel located within the near-field region by giving a vote of the strength of the direction of a pixel to a vote cell to which the pixel belongs out of vote cells of a rotated vote cell pattern along the corrected direction.

17. A computer-implemented method of calculating a local feature amount in which the local feature amount of an image is calculated, the method comprising:
   extracting, using a processor, a feature point from the image;
   setting, using the processor, a near-field area near the feature point;
   calculating, using the processor, a direction of each pixel located within the near-field region;
   quantizing, using the processor, the direction of each pixel located within the near-field region;
   calculating, using the processor, a strength of the direction of each pixel located within the near-field area;
   generating, using the processor, a direction histogram by giving a vote of the strength of the direction of the pixel along the direction of the pixel that is quantized in the quantizing of the direction and detecting a direction in which a local maximum value of the direction histogram is included as the main axis direction of the near-field region;
   determining, using the processor, a vote cell to which the pixel belongs in the vote cell pattern corresponding to the main axis direction for each pixel located within the near-field area by referring to a vote cell pattern table in which a plurality of vote cell patterns acquired by rotating a reference vote cell pattern by a plurality of angles corresponding to a plurality of main axis directions detected in the generating of a direction histogram is stored;
   acquiring, using the processor, corrected directions corresponding to the main axis direction and the directions quantized in the quantizing of the direction by referring to a direction correcting table in which the corrected directions for the directions quantized in the quantizing of the direction are defined for each one of the plurality of main axis directions detected in the generating of a direction histogram and detecting of a direction for each pixel located within the near-term area; and
   acquiring, using the processor, a local feature amount of the feature point for each pixel located within the near-field region by giving a vote of the strength of the direction of a pixel to a vote cell determined in the determining of a vote cell along the corrected direction.

18. A method of searching for corresponding points that is used for searching for corresponding points of a plurality of images, the method comprising:
   calculating local feature amounts of the plurality of images by using the method according to claim 16 or 17; and
   searching for the corresponding points of the plurality of images by comparing the local feature amounts of the plurality of images that are calculated in the calculating of local feature amounts with each other.

19. A non-transitory computer-readable medium having stored thereon a computer executable program that when executed causes an operation processing device to perform the method of searching for corresponding points according to claim 18.

20. A non-transitory computer-readable medium having stored thereon a computer executable program that when executed causes an operation processing device to perform the method of calculating a local feature amount according to claim 16 or 17.

* * * * *

UNITED STATES PATENT AND TRADEMARK OFFICE
CERTIFICATE OF CORRECTION

PATENT NO. : 8,774,508 B2
APPLICATION NO. : 13/405723
DATED : July 8, 2014
INVENTOR(S) : Mitsuru Ambai et al.

It is certified that error appears in the above-identified patent and that said Letters Patent is hereby corrected as shown below:

ON THE TITLE PAGE:

At item (12), change "Anbai et al." to --Ambai et al.--.

At item (75), Inventors, change "Mitsuru Aubai, Tokyo (JP)" to --Mitsuru Ambai, Tokyo (JP)--.

Signed and Sealed this
Eighteenth Day of August, 2015

Michelle K. Lee
*Director of the United States Patent and Trademark Office*